US012767089B2

(12) United States Patent
Crawford et al.

(10) Patent No.: US 12,767,089 B2
(45) Date of Patent: Oct. 20, 2026

(54) VEHICLE THEFT DETERRENT DEVICES AND METHODS

(71) Applicants: Timothy Crawford, Golden, CO (US); Robert Nelson, Arvada, CO (US)

(72) Inventors: Timothy Crawford, Golden, CO (US); Robert Nelson, Arvada, CO (US)

( * ) Notice: Subject to any disclaimer, the term of this patent is extended or adjusted under 35 U.S.C. 154(b) by 24 days.

(21) Appl. No.: 18/667,157

(22) Filed: May 17, 2024

(65) Prior Publication Data

US 2024/0391417 A1 Nov. 28, 2024

Related U.S. Application Data

(60) Provisional application No. 63/585,215, filed on Sep. 25, 2023, provisional application No. 63/518,170, filed on Aug. 8, 2023, provisional application No. 63/513,549, filed on Jul. 13, 2023, provisional application No. 63/504,281, filed on May 25, 2023.

(51) Int. Cl.
*B60R 25/00* (2013.01)

(52) U.S. Cl.
CPC .......... *B60R 25/008* (2013.01); *B60R 25/007* (2013.01)

(58) Field of Classification Search
CPC ... B60R 25/002; B60R 25/003; B60R 25/006; B60R 25/008; B60R 25/007; B60R 25/02144; B60R 25/0215; B60R 25/021; B60R 25/0227; B60R 25/0221; B60R 25/2525; Y10T 70/5867; Y10T 70/5934
USPC .................................................... 70/247, 232
See application file for complete search history.

(56) References Cited

U.S. PATENT DOCUMENTS

| | | | | | |
|---|---|---|---|---|---|
| 3,710,606 | A * | 1/1973 | Prince | B60R 25/066 | 70/203 |
| 4,791,795 | A * | 12/1988 | Burgess | F16H 61/22 | 70/202 |
| 5,125,249 | A * | 6/1992 | Fields | B60R 25/066 | 70/202 |
| 5,311,756 | A * | 5/1994 | Villani | B60R 25/066 | 70/202 |
| 5,361,613 | A * | 11/1994 | Fort | B60R 25/0221 | 70/202 |
| 5,410,896 | A * | 5/1995 | Gleason | B60R 25/066 | 109/34 |
| 5,609,049 | A * | 3/1997 | Rundle | B60R 25/066 | 70/202 |
| 6,382,000 | B1 * | 5/2002 | Horton | B60R 25/066 | 70/202 |
| 2009/0007611 | A1 * | 1/2009 | Yair | F16H 61/22 | 70/247 |
| 2012/0137741 | A1 * | 6/2012 | Yu | B62H 5/003 | 70/53 |

FOREIGN PATENT DOCUMENTS

| | | | | |
|---|---|---|---|---|
| DE | 611262 C * | 3/1935 | | B60R 25/0221 |
| GB | 2157244 A * | 10/1985 | | B60R 25/008 |

* cited by examiner

*Primary Examiner* — Suzanne L Barrett
(74) *Attorney, Agent, or Firm* — Robert Nelson

(57) ABSTRACT

A vehicle theft deterrent box includes a housing having at least a first portion and a second portion. The theft deterrent box has an open state when at least a portion of a gear shifter of a vehicle is receivable in the housing and a closed state when at least a portion of the gear shifter is received in the housing and the housing is not removable from the gear shifter. Other devices and methods are disclosed.

18 Claims, 18 Drawing Sheets

VEHICLE THEFT DETERRENT DEVICES AND METHODS

This application is claims benefits of U.S. provisional application 63/504,281 filed on May 25, 2023, for Vehicle Theft Deterrent Devices and Methods; 63/513,549 filed on Jul. 13, 2023 for Vehicle Theft Deterrent Devices and Methods; 63/518,170 filed on Aug. 8, 2023 for Vehicle Theft Deterrent Devices and Methods; and 63/585,215 filed on Sep. 25, 2023, for Vehicle Theft Deterrent Devices and Methods, each of which is hereby incorporated by reference herein in its entirety.

FIELD

The present disclosure relates to devices and methods for deterring vehicle thefts.

BACKGROUND

Vehicles are continually stolen. Thieves enter a vehicle, override the vehicle ignition, and force the vehicles into a gear, which enables the thieves to drive the vehicles away. Accordingly, a need exists for devices and methods that deter thieves from stealing vehicles.

DETAILED DESCRIPTION

Figure 1A:
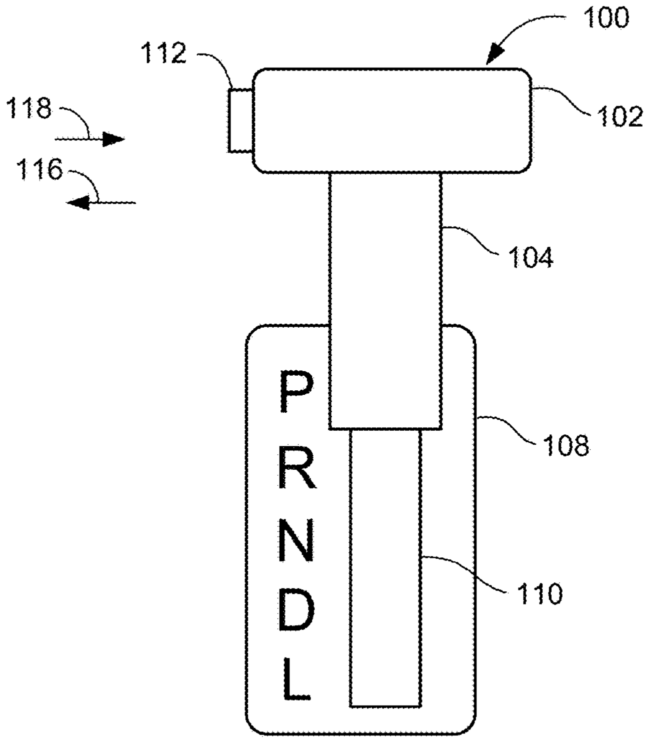
FIG. 1A illustrates a front isometric view of a gear shifter of a vehicle wherein the gear shifter has a release mechanism located on a handle in accordance with embodiments of the disclosure.

All the articles, devices, systems, and/or methods disclosed and claimed herein can be made and executed without undue experimentation, given the present disclosure. While the articles, devices, systems, and methods of the disclosure have been described in terms of particular embodiments, it will be apparent to those of skill in the art that variations may be applied to the articles, compositions and/or methods and in the steps or in the sequence of steps of the methods described herein without departing from the concept, spirit and scope of the disclosure. All such similar substitutes and modifications apparent to those skilled in the art are deemed to be within the spirit, scope, and concept of the inventive concepts as defined by the appended claims.

As utilized under the present disclosure, the following terms, unless otherwise indicated, shall be understood to have the following meanings. As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Vehicles are continuously stolen. Thieves break into vehicles and override ignition systems and force gear shifters out of park, which enable the thieves to start the vehicles and drive the vehicles away. The ignitions may have lock positions that, when locked, prevent gear shifters in the vehicles from changing gears, such as transitioning out of a park gear. When an ignition is placed out of a locked position, the gear shifter may be moved by pressing a release mechanism located on the gear shifter and the steering wheel may be rotated. Thus, in order to shift a vehicle gear shifter, the ignition needs to be unlocked and the release mechanism on the gear shifter has to be engaged. However, by breaking the ignition system and the release mechanism on the gear shifter, a thief is readily able to shift the vehicle out of the park gear and steal the vehicle.

The devices, systems, and methods described herein deter vehicles from being stolen by preventing the release mechanisms on the gear shifters from being accessed and/or engaged. A theft deterrent box may include a housing forming a cavity that may be placed over a gear shifter and locked so that the theft deterrent box cannot readily be removed from the gear shifter. The interior or cavity of the housing may be sized and configured to prevent the interior of the housing from contacting and thus, engaging, the release mechanism on the gear shifter. In some embodiments, the housing may be at least partially curved, which prevents the release mechanism from being accessed by the housing, such as when the housing is skewed relative to the gear shifter. In some embodiments, the housing may be at least partially spherical or elliptical.

In some embodiments, the theft deterrent box may have a cable (e.g., a cord) or the like attached to the steering wheel of the vehicle. The cable may lock to the theft deterrent box so that the steering wheel is not able to rotate to enable operation of the vehicle. Thus, should a thief engage the release mechanism with the theft deterrent box affixed to the gear shifter, the thief still cannot steal the vehicle because the steering wheel is inoperable.

Figure 1B:
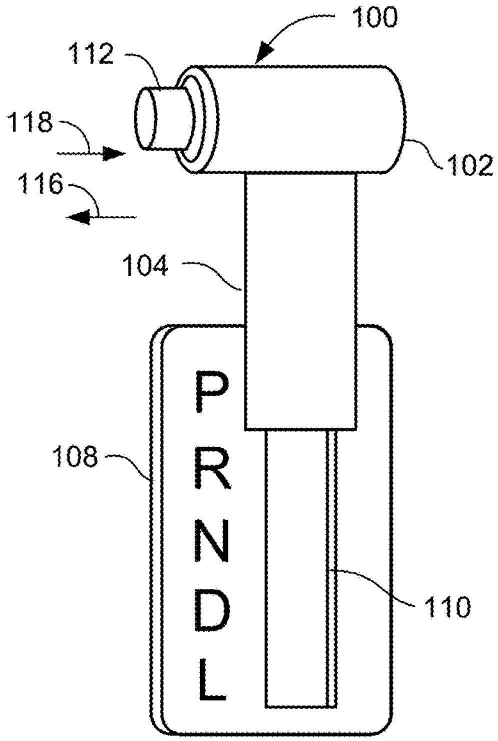
FIG. 1B illustrates a side isometric view of the gear shifter of FIG. 1A in accordance with embodiments of the disclosure.

Reference is made to FIGS. 1A-1B, which illustrate a front isometric view and a side isometric view, respectively, of a gear shifter 100 that may used in a vehicle. The gear shifter 100 may include a handle 102 and a shaft 104. The gear shifter 100 may be movable relative to a plate 108 having markings that indicate a gear that the transmission of the vehicle is in per the position of the gear shifter 100. In the embodiment of FIGS. 1A and 1B, the transmission is in a parked position, which may prevent the vehicle from moving. The gear shifter 100 may be movable within a channel 110 in the plate 108. Movement of the gear shifter 100 relative to the channel 110 may change gears of the transmission out of park and into reverse, neutral, drive, and low gear. Other transmission gear and channel configurations may be used in the vehicle.

The gear shifter 100 may have a release mechanism 112. The release mechanism may be located on the handle 102 of the shaft 104 and is movable relative to the gear shifter 100. Engaging the release mechanism 112 enables the gear shifter 100 to move from the park gear so the vehicle may move. The gear shifter 100 may enter a locked state when the gear shifter 100 is moved to a gear, such as the park gear, and the vehicle ignition is disengaged (e.g., moved to a locked position). For example, when a user parks the vehicle, the user may move the gear shifter 100 to the park gear and disengage the vehicle ignition, which may cause the gear shifter 100 to lock the vehicle in the park gear. The gear shifter 100 may only be moved from the park position by engaging the release mechanism 112. In some embodiments, the ignition may also have to be engaged. The theft deterrent boxes and methods described herein deter thieves from contacting and/or engaging the release mechanism 112.

Figure 2:
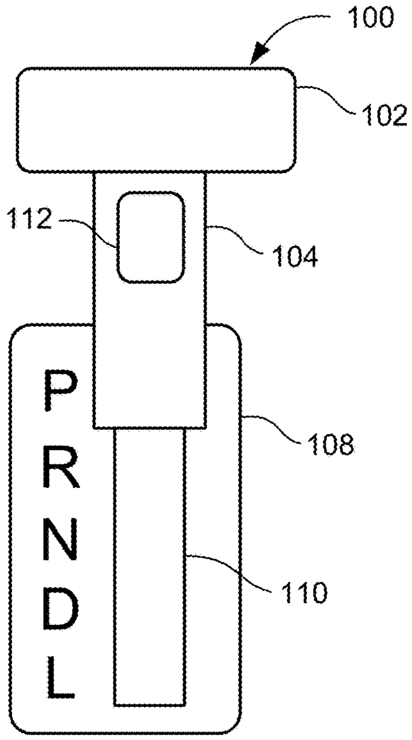
FIG. 2 illustrates a top isometric view of a gear shifter of a vehicle wherein the gear shifter has a release mechanism located on a shaft in accordance with embodiments of the disclosure.

In the embodiment of FIGS. 1A-1B, the release mechanism 112 is located on the handle 102. A spring mechanism (not shown) or the like may force the release mechanism 112 in a direction 116, which is out of the handle. A user may press the release mechanism 112 in a direction 118 to engage the release mechanism 112 and move the gear shifter 100 out of the park gear. Additional reference is made to FIG. 2, which illustrates an embodiment of the gear shifter 100 with the release mechanism 112 located on the shaft 104 rather than the handle 102. The release mechanism 112 of FIG. 2 may function in the same manner as the embodiment of FIG. 1 except that the release mechanism 112 may be normally forced away from the shaft 104. A user may engage the release mechanism 112 by pressing the release mechanism 112 toward the shaft 104. The release mechanism 112 may be located in other portions of the gear shifter 100. For example, the release mechanism 112 may be located on the front of the handle 102 or the shaft 104.

In some embodiments, the release mechanism 112 and/or the gear shifter 100 may be locked in response to a state of an ignition of the vehicle. For example, when the vehicle is parked, the vehicle ignition may be set to a locked state, which prevents the steering wheel from rotating and the release mechanism 112 from being engaged. In some embodiments, the state of the vehicle ignition may prevent the shaft 104 from moving. Thus, when the vehicle ignition is in the locked state, the release mechanism 112 cannot be engaged and the transmission cannot be transitioned from the park gear. Thus, the vehicle cannot be moved or stolen. However, should a thief tamper with the vehicle ignition and move the vehicle ignition from the locked state, the release mechanism 112 may be engaged and the vehicle may be moved or stolen. In some embodiments, a thief may tamper with or break the release mechanism 112 to enable the gear shifter 100 to move and transition the transmission from the park gear. Thus, the vehicle is able to be stolen. The theft deterrent boxes and methods disclosed herein deter thieves from accessing the release mechanism 112, which deters the thieves from stealing the vehicles.

Figure 3A:
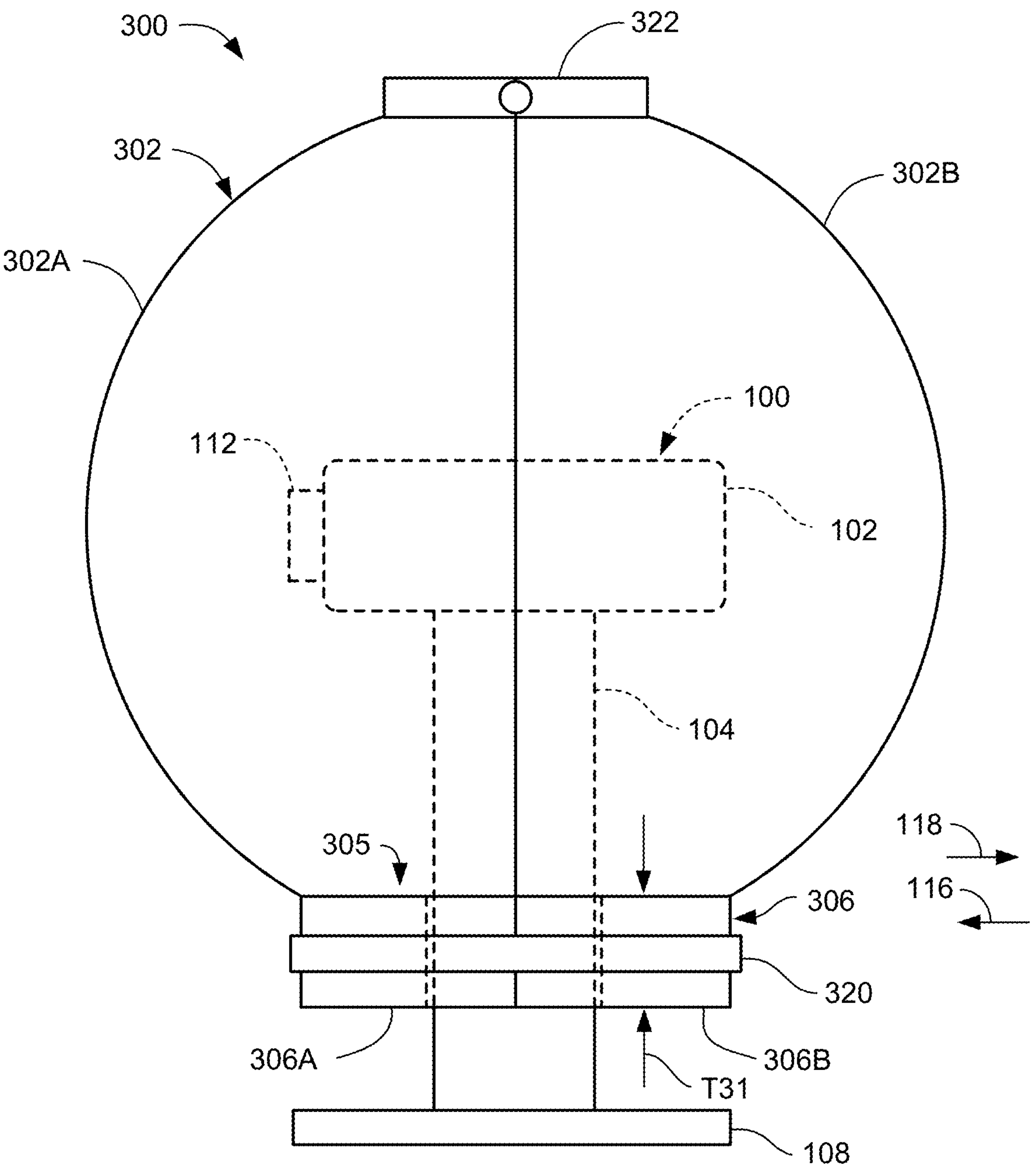
FIG. 3A illustrates a front elevation view of an embodiment of a theft deterrent box in a closed state and placed over a gear shifter of a vehicle in accordance with embodiments of the disclosure.
Figure 3B:
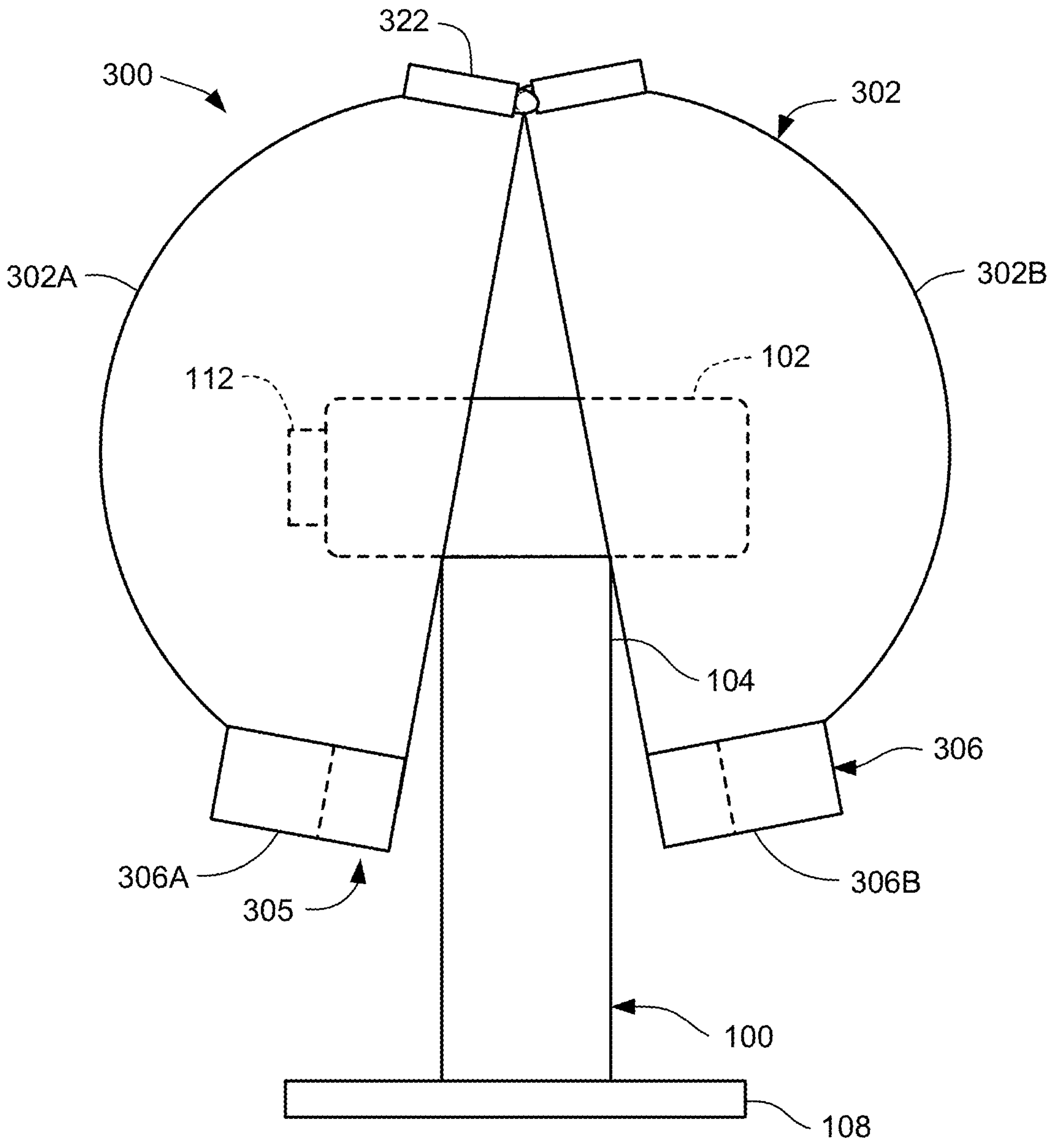
FIG. 3B illustrates the theft deterrent box of FIG. 3A in an open state and placed over a gear shifter of a vehicle in accordance with embodiments of the disclosure.
Figure 3C:
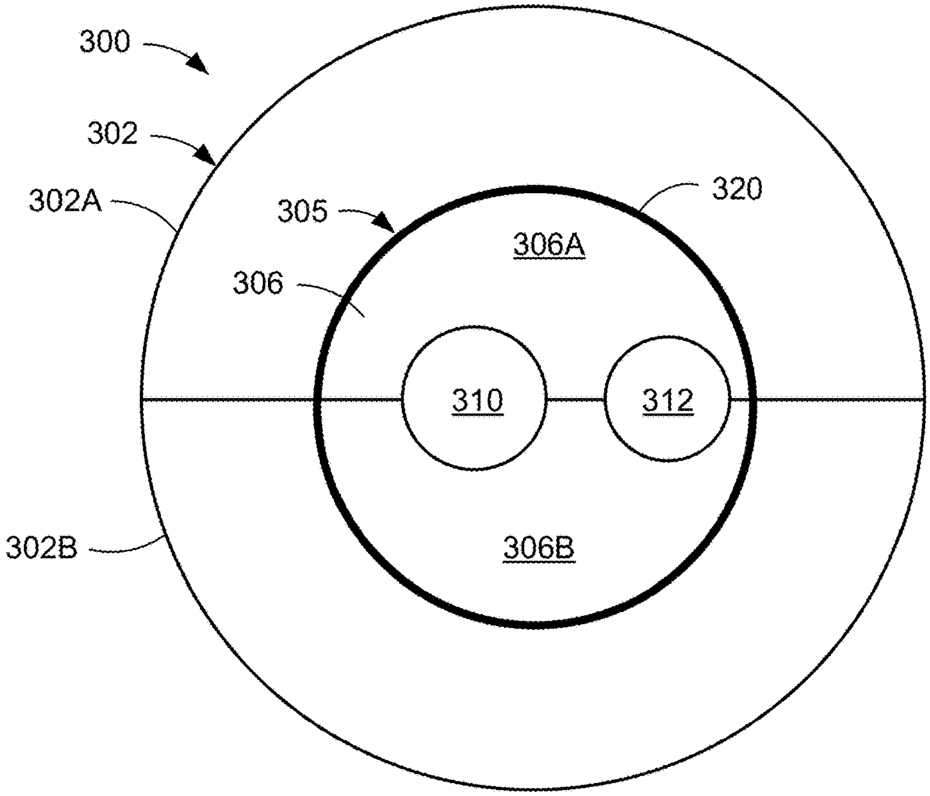
FIG. 3C illustrates a bottom view of an embodiment of the theft deterrent box of FIG. 3A removed from the gear shifter, wherein the theft deterrent box includes a block having two holes in accordance with embodiments of the disclosure.

Additional reference is made to FIG. 3A, which illustrates an embodiment of a front elevation view of a theft deterrent box 300 in a closed state placed over the gear shifter 100. Reference is also made to FIG. 3B, which illustrates the theft deterrent box 300 in an open state and placed over the gear shifter 100. FIG. 3C illustrates an embodiment of a bottom view of the theft deterrent box 300 in a closed state. The theft deterrent box 300 deters unauthorized persons from accessing the release mechanism 112, which deters theft of the vehicle. The theft deterrent box 300 includes a housing 302 that is configured to be placed over the gear shifter 100, but not contact the release mechanism 112 so as to engage the release mechanism 112. The theft deterrent box 300 may form a cavity that at least partially surrounds at least a portion of the gear shifter 100. The diameter of the housing 302 may prevent the housing from contacting the release mechanism 112. In some embodiments, the diameter may be about six inches (about 15.25 cm). In other embodiments, the diameter may be between 5.5 inches (14.0 cm) and 6.5 inches (16.5 cm). Other diameters may be used that prevent the housing 302 from contacting the release mechanism 112.

The housing 302 may be at least partially curved, such as at least partially spherical or elliptical. In other embodiments, the housing 302 may be at least partially parallel piped or other shapes that prevent the interior of the housing 302 from contacting the release mechanism 112. For example, the diameter of about six inches may prevent the interior of the housing 302 from contacting the release mechanism 112. The housing 302 may include at least two portions that fit together to form the housing 302. In the embodiment of FIGS. 3A-3C, the housing 302 is at least partially spherical and is formed from a first portion 302A and a second portion 302B that both may be half spheres or hemispherical. The theft deterrent box 300 may include a hinge 322 that pivotally couples the first portion 302A and the second portion 302B together. The hinge 322 may be located in different portions of the housing 302. Thus, the first portion 302A and the second portion 302B may be configured to couple together.

The first portion 302A and the second portion 302B may lock together to prevent thieves from opening the theft deterrent box 300 to the open state and accessing the release mechanism 112. In the embodiment of FIG. 3A, a band 320 is configured to wrap around a portion of both the first portion 302A and the second portion 302B to lock the first portion 302A and the second portion 302B together. Other locking devices that may be used in the theft deterrent box 300 to prevent the theft deterrent box 300 from transitioning from the closed state to the open state are described herein.

The theft deterrent box 300 may include an opening 305 that is sized and/or configured to receive a block 306. The block 306 may have a first portion 306A and a second portion 306B that are configured to meet or join together to form the block 306 as described herein. The block 306 may include one or more holes configured to receive the shaft 104 of the gear shifter 100. In the embodiment of FIG. 3C, the block 306 includes a first hole 310 and a second hole 312. A portion of each hole may be formed in the first portion 306A and the second portion 306B of the block 306 so that the holes are formed when the first portion 306A and the second portion 306B are adjacent each other. In summary, the holes are formed over or around the shaft 104 as the theft deterrent box 300 is transitioned from the open state of FIG. 3B to the closed state of FIG. 3A. The holes 310, 312 may be too small for the handle 102 to pass through the holes 310, 312. Therefore, when the theft deterrent box 300 is located on or locked over the handle 102 as shown in FIG. 3A, the theft deterrent box 300 is not readily removable over the handle 102 and from the gear shifter 100.

In some embodiments, the block 306 may have a single hole. The block 306 may be readily exchangeable with blocks having different diameters. The holes may also have different diameters. In some embodiments, the holes may have diameters of between one inch (1.5 cm) and 1.5 inches (3.8 cm). In some embodiments, the diameters may be about 1.375 inches (about 3.5 cm).

Figure 3D:
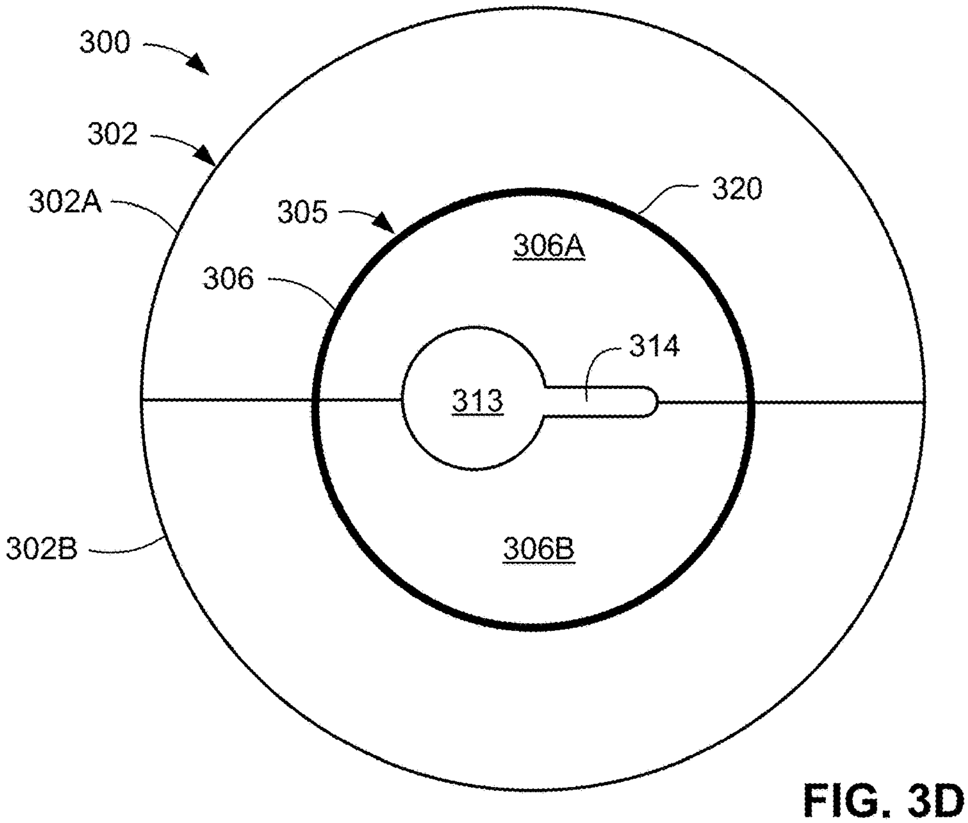
FIG. 3D illustrates a bottom view of the theft deterrent box of FIG. 3C with a block having a single hole and a slot extending from the hole in accordance with embodiments of the disclosure.

Additional reference is made to FIG. 3D, which illustrates a bottom view of the theft deterrent box 300 with a block 306 having a single hole 313 and a slot 314 extending from the hole 313. The slot 314 may be configured to receive a cloth (e.g., leather) or the like surrounding the shaft 104. Thus the cloth is received in the slot 314 when the theft deterrent box 300 is placed in the closed state, which prevents the cloth from inferring with closure of the theft deterrent box 300.

The block 306 has a thickness T31 that reduces the movement of the housing 302 relative to the gear shifter 100. In some embodiments, the thickness T31 may be between 0.25 inches (0.64 cm) and 1.0 inches (2.5 cm). In other embodiments, the thickness T31 may be approximately 0.25 inches to 0.5 inches (1.3 cm). In other embodiments, the thickness T31 may be approximately 0.375 inches (0.95 cm). The thickness T31 may be thicker or thinner depending on the thickness of the shaft 104 and the diameters of the holes 310, 312. As described herein, the thickness T31 may reduce the skew of the theft deterrent box 300 relative to the shaft 104.

Figure 4:
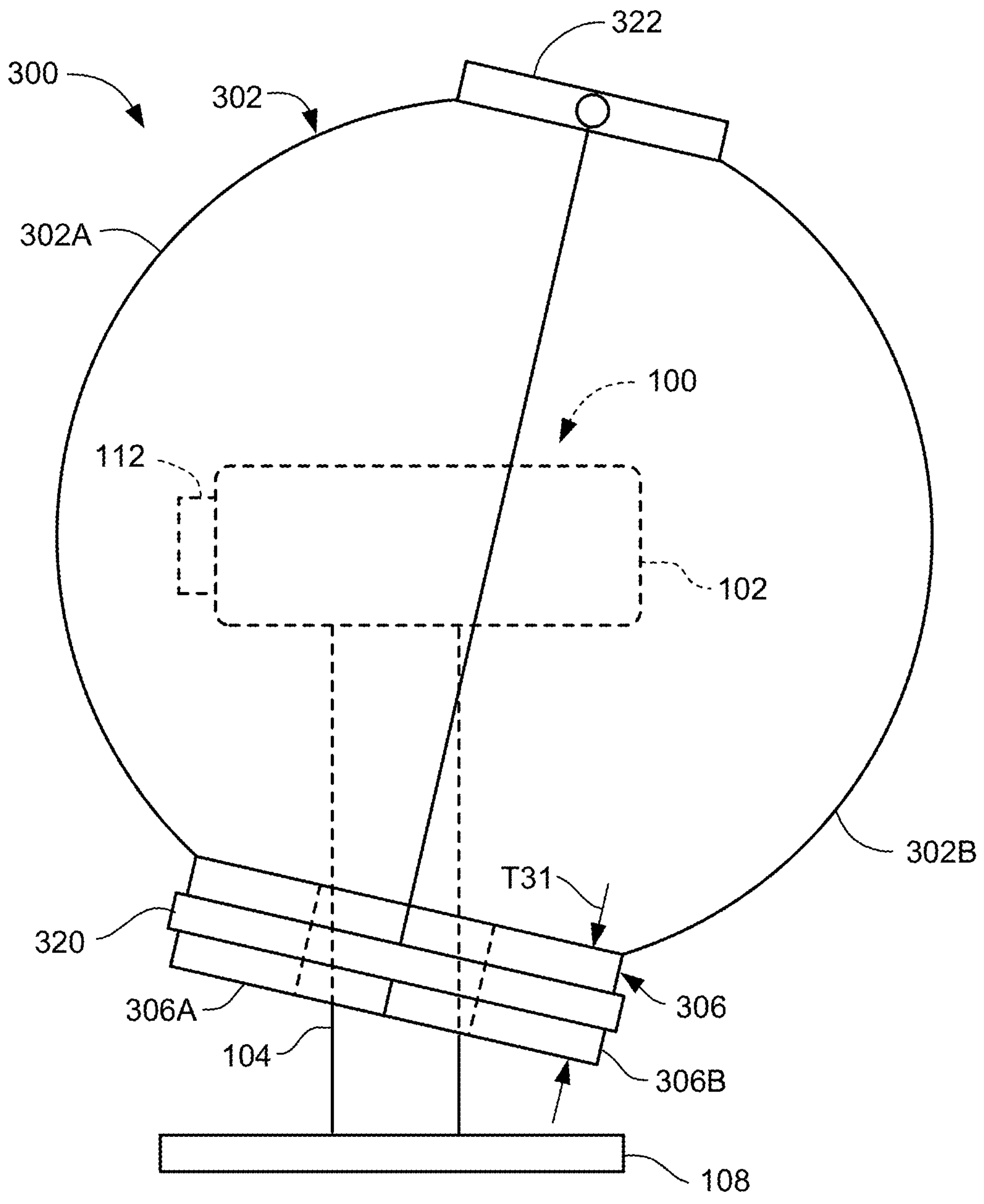
FIG. 4 illustrates a front elevation view of the theft deterrent box of FIG. 1 placed over a gear shifter of a vehicle, wherein the theft deterrent box is skewed relative to the gear shifter in accordance with embodiments of the disclosure.

Additional reference is made to FIG. 4, which illustrates the theft deterrent box 300 skewed relative to the gear shifter 100, but prevented from engaging the release mechanism 112. The limit of the skew of the theft deterrent box 300 is at least a function of the thickness T31 and the diameters of the first hole 310 the second hole 312, and the diameter of the shaft 104. By preventing the housing 302 from contacting the release mechanism 112, thieves are deterred from moving the gear shifter 100 out of the park position.

Figure 5:
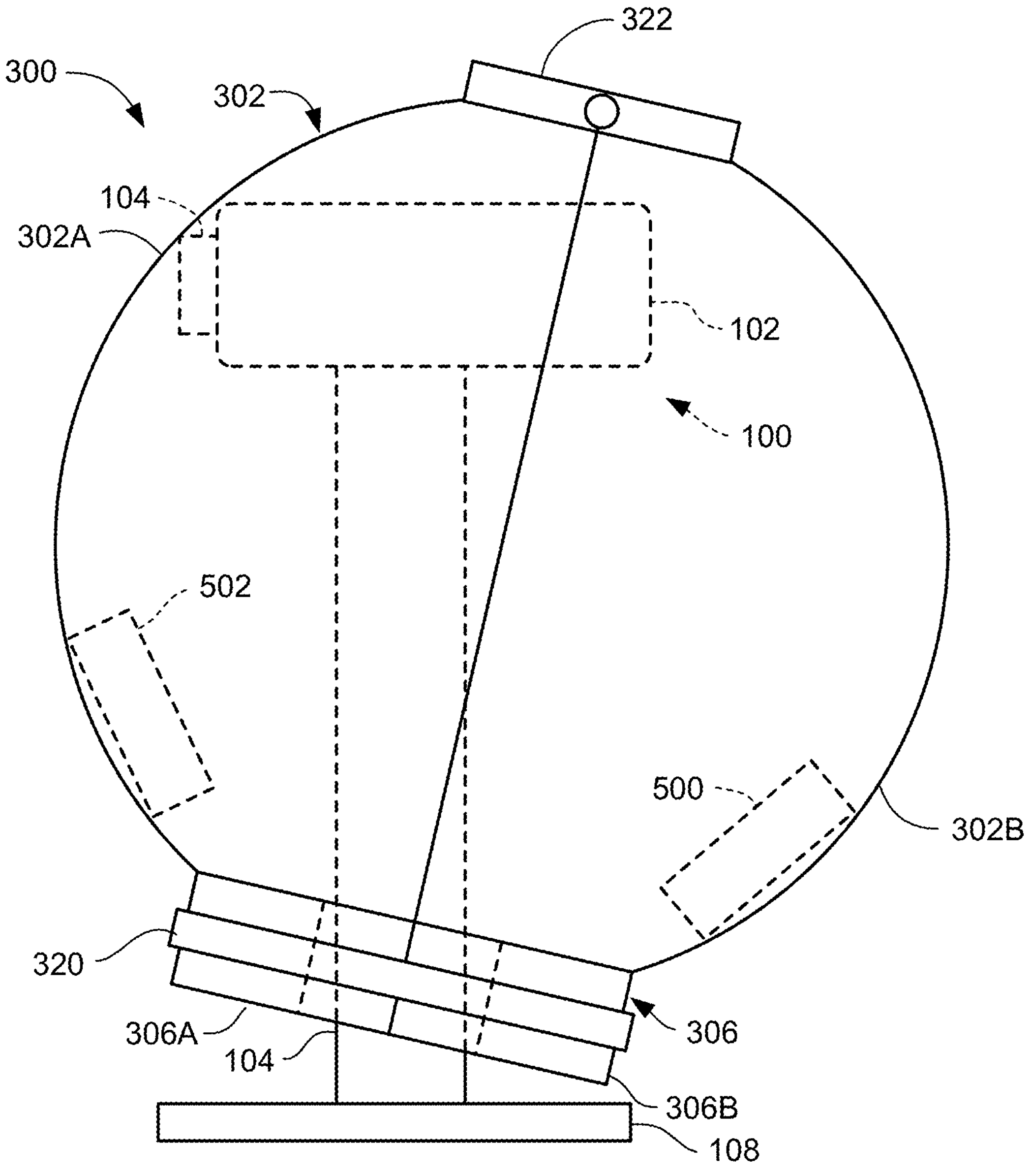
FIG. 5 illustrates a side elevation view of the theft deterrent box of FIG. 4 with the theft deterrent box contacting a portion of the gear shifter in accordance with embodiments of the disclosure.

FIG. 5 shows an example of the theft deterrent box 300 in contact with the gear shifter 100. As shown in FIG. 5, the shape of the theft deterrent box 300 prevents the housing 302 from engaging the release mechanism 112 regardless of how the theft deterrent box 300 is manipulated relative to the gear shifter 100.

In some embodiments, the block 306 may be replaceable. A first block may have one or more holes of certain diameters. A second block may have one or more holes having different diameters. In some embodiments, the block 106 may be replaceable with blocks having single holes of different diameters. A user may replace the first block with a second block having different hole configurations. In some embodiments, the first block and the second block may have different thicknesses. Thus, the theft deterrent box 300 may accommodate different types of gear shifters, such as different gear shifters having different shaft diameters and release mechanism locations. The block 306 may be received in the housing 302 so that the block 306 is not removable when the theft deterrent box 300 is in the closed state.

As described above, the theft deterrent box 300 has an open state wherein the theft deterrent box 300 is able to receive the handle 102 (FIG. 1A) of the gear shifter 100 (FIG. 1A). For example, the housing 302 may open wide enough in the open state to be placed over at least the handle 102 of the gear shifter 100 as shown in FIG. 3B.

As also described herein, the theft deterrent box 300 has a closed or locked state wherein the handle 102 is received in the theft deterrent box 300 as shown in FIGS. 3A and 4 and the first portion 302A of the housing 302 is fixed (e.g., locked) to the second portion 302B. The shaft 104 of the gear shifter 100 is located in either the first hole 310 or the second hole 312, which deters the theft deterrent box 300 from being removed from the gear shifter 100. The first hole 310 or the second hole 312 may be small enough so that the handle 102 cannot readily pass through the first hole 310 or the second hole 312 when the theft deterrent box 300 is in the closed state. The theft deterrent box 300 may be able to be locked in the closed state, which deters a thief or unauthorized person from accessing the release mechanism 112 of the gear shifter 100.

The shape of the housing 302 may prevent the housing 302 from engaging the release mechanism 112 when the theft deterrent box 300, while in the closed state, is moved relative to the gear shifter 100. For example, a spherical or elliptical housing 302 may prevent the housing 302 from engaging the release mechanism 112. The diameter or the housing 302 may cause the housing 302 to contact the handle 102 without engaging the release mechanism 112. A diameter of about six inches (about 15 cm) prevents the housing 302 from engaging many release mechanisms. Additional reference is made to FIG. 4, which illustrates an embodiment of the theft deterrent box 300 moved relative to the gear shifter 100. The thickness T31 of the block 306 may limit the skew of the housing 302 relative to the gear shifter 100, which may prevent the housing 302 from contacting the handle 102 and/or the release mechanism 112.

Should the housing 302 be able to contact the handle 102, the shape of the housing 302 limits the movement of the housing 302 so that the housing 302 contacts the handle 102 and not the release mechanism 112. Thus, thieves are deterred from accessing the release mechanism 112 when the theft deterrent box 300 is in the closed state and located over the gear shifter 100.

With additional reference to FIG. 3C, the first hole 310 and the second hole 312 may have different diameters to accommodate shafts of gear shifters having different diameters. One or both the first hole 310 or the second hole 312 may be offset from the center of the block 306. The offset holes enable the theft deterrent box 300 to be placed in different locations relative to the gear shifter 100. The different locations may prevent the theft deterrent box 300 from interfering with components in the vehicle, such as the dashboard. In a similar manner, the single hole 313 may be offset.

In some embodiments, the theft deterrent box 300 may include a motion sensor 500 (FIG. 5) that senses motion of the theft deterrent box 300. In some embodiments, the motion sensor 500 generates a signal that generates an alarm in response to sensing motion. The signal may be generated when the theft deterrent box 300 is in a locked state and is moved. The motion sensor 500 may generate the signal upon movement or vibration in response to a person tampering with the theft deterrent box 300 when the theft deterrent box is in the locked state. For example, the signal may be generated in response to tilting or acceleration of the theft deterrent box 300. The signal may also be generated in response to vibration caused by cutting of the theft deterrent box 300 or the vehicle engine starting when the theft deterrent box 300 is in the locked or closed state. The signal may cause an alarm to commence. The alarm may, as examples, be visual, audible, wireless, and/or tactile. In some embodiments, the alarm may be a light that signals, such as flashes. The alarm may be a siren or other noise. The alarm may also be tactile, such as shaking or vibrating the theft deterrent box 300.

In some embodiment, theft deterrent box 300 may include a transmitter 502 that may function in conjunction with the motion sensor 500 and/or other devices associated with the theft deterrent box 300. The transmitter 502 may transmit status signals to the owner of the theft deterrent box 300. The transmission may, as examples, be wireless transmissions (cellular telephone calls or wifi transmissions) to the owner. For example, if the motion sensor 500 indicates that the theft deterrent box 300 is moving or being tampered with as described above, the motion detector may transmit a signal to the transmitter 502. The transmitter 502 may then transmit a wireless signal that may, as an example, cause an application operating on a mobile device to warn the owner of the tampering.

Figure 6:
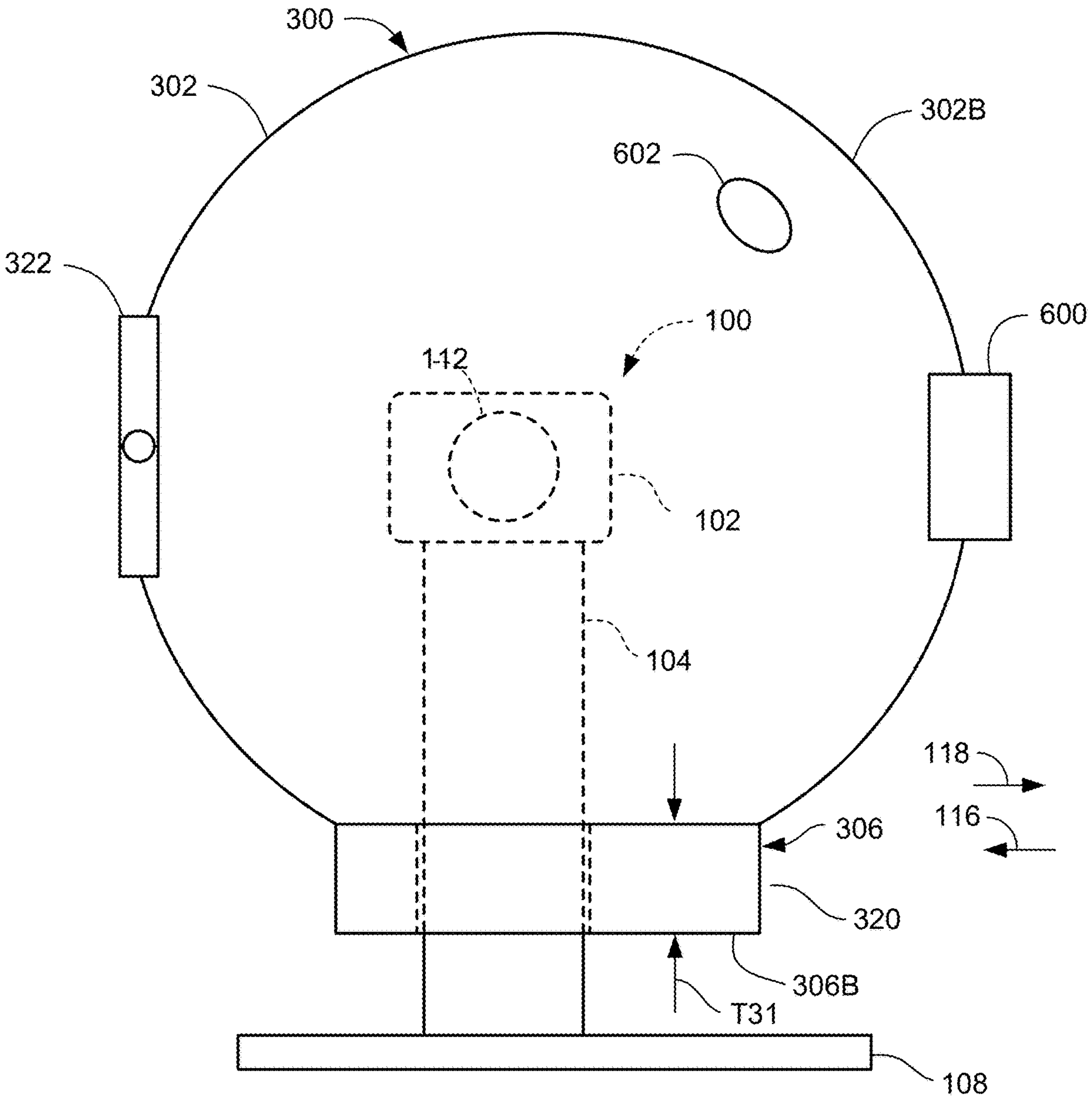
FIG. 6 illustrates a side elevation view of an embodiment of a theft deterrent box having a side-mounted hinge and a locking mechanism located opposite the hinge in accordance with embodiments of the disclosure.

Additional reference is made to FIG. 6, which illustrates an elevation view of the theft deterrent box 300 for a viewpoint 90° rotated from the viewpoint of FIG. 3A and with the hinge 322 located on a side rather than the top of the housing 302. In the embodiment of FIG. 6, the second portion 302B of the housing 302 is shown. A lock 600 configured to lock the first portion 302A and the second portion 302B together may also be placed on the housing 302. In the embodiment of FIG. 6, the lock 600 is placed opposite the hinge 322. The lock serves to lock the first portion 302A and the second portion 302B of the housing 302 together to prevent the theft deterrent box 300 from opening to the open state. The housing 302 may include a dimple 602 or the like that enables a user to grasp the housing 302 to transition the theft deterrent box 300 between the open and closed states.

Figure 7A:
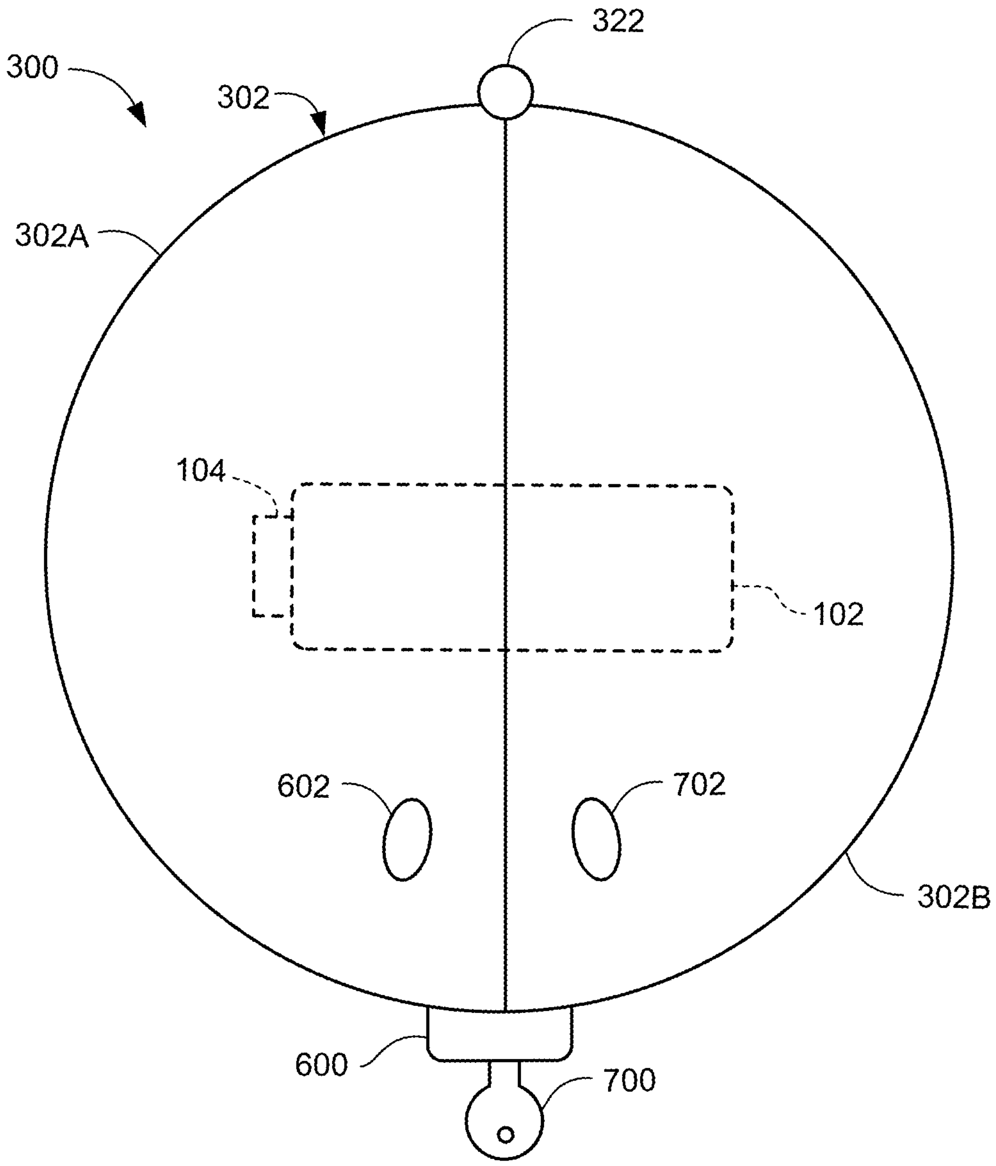
FIG. 7A illustrates a top plan view of the theft deterrent box of FIG. 6 in a closed state in accordance with embodiments of the disclosure.

Additional reference is made to FIG. 7A, which illustrates a top plan view of an embodiment of the theft deterrent box 300. The lock 600 may be operated by a key 700. In some embodiments, the key 700 may fit other locks in the vehicle. Thus, the user of the theft deterrent box 300 may not need to carry a separate key for the theft deterrent box 300. As described below, devices such as biometric device may be used to open the theft deterrent box 300. A dimple 702 may be located on the second portion 302B of the housing 302 opposite the dimple 602. Additional reference is made to FIG. 7B, which illustrates the theft deterrent box 300 of FIG. 7A in an open state. As shown, the housing 302 may be configured to open wide enough to receive the gear shifter 100.

Figure 7B:
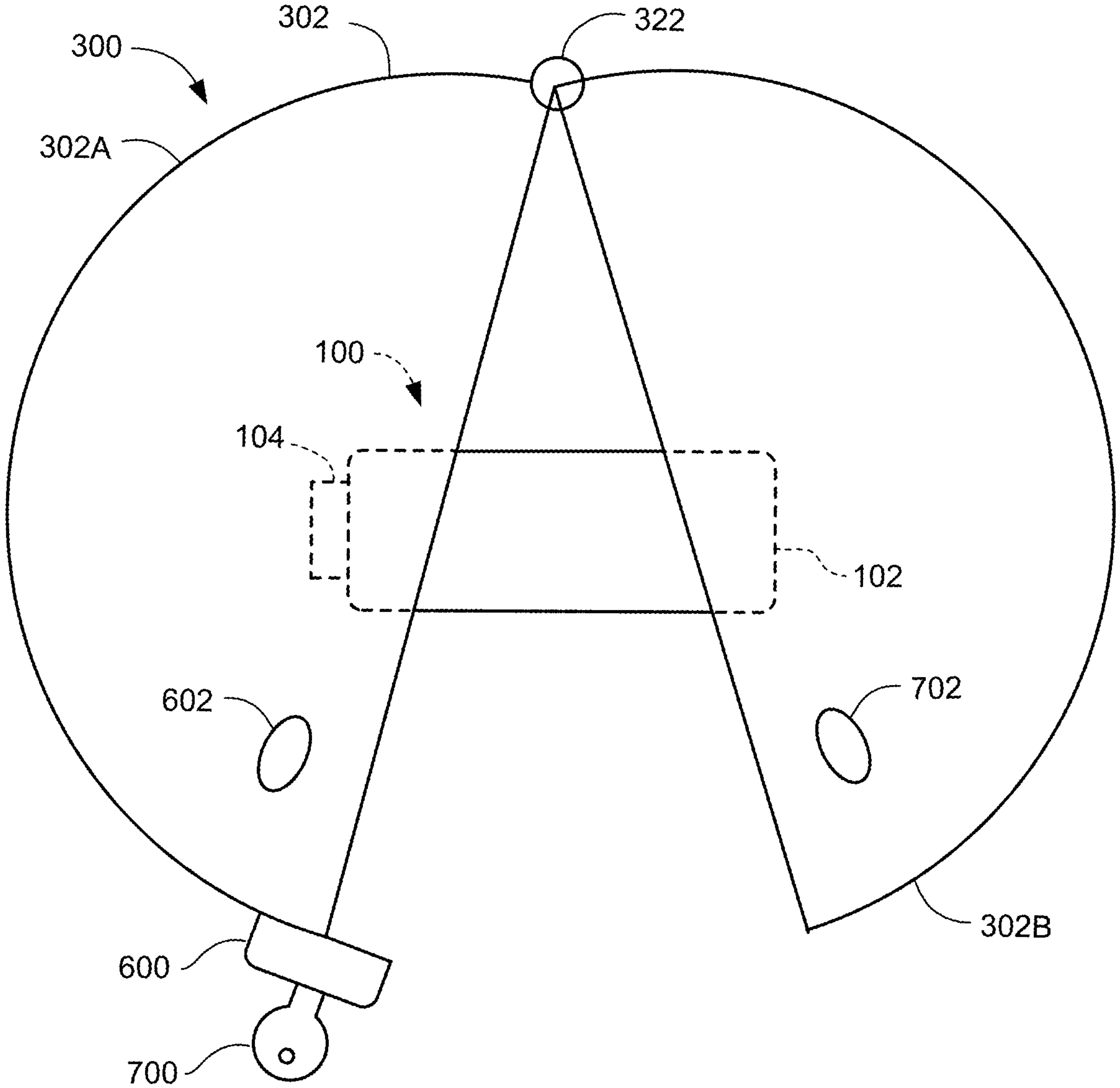
FIG. 7B illustrates the theft deterrent box of FIG. 7A in an open state in accordance with embodiments of the disclosure.
Figure 8:
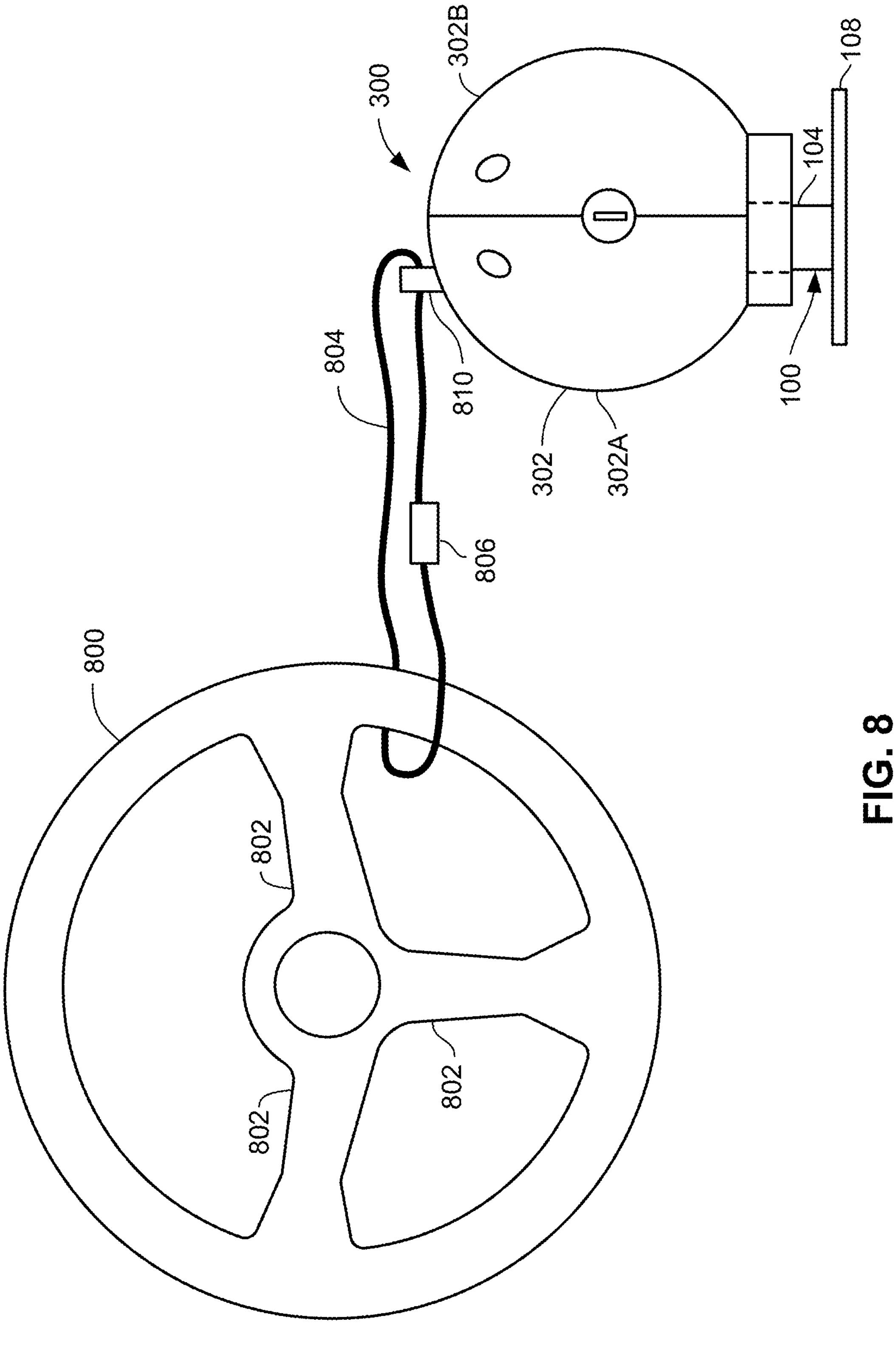
FIG. 8 illustrates a theft deterrent box in a closed state around a vehicle shifter and coupled to a steering wheel of the vehicle via a cable in accordance with embodiments of the disclosure.

Additional reference is made to FIG. 8, which illustrates the theft deterrent box 300 in a closed state around the gear shifter 100 and coupled to a steering wheel 800 of the vehicle via a cord 804. The cord 804 may be made from a material such as steel that is not easy to cut. The steering wheel 800 may include spokes 802, wherein the cord 804 is looped between the spokes 802. In some embodiments, the cord 804 may lock to the steering wheel 800 and the theft deterrent box 300 by use of a lock 806. The lock 806 may be opened by the key 700 (FIG. 7B). When the steering wheel 800 is coupled to the theft deterrent box 300 as shown in FIG. 8, rotation of the steering wheel 800 is limited. Accordingly, the vehicle may be unusable and cannot be driven or stolen. In the embodiment of FIG. 8, the theft deterrent box 300 may include a tab 810 extending from the housing 302, wherein the cord 804 may pass through the tab 810. In use, the cord 804 may pass through the steering wheel 800 and the tab 810 and locked by the lock 806. Because the theft deterrent box 300 is locked to the gear shifter 100, the steering wheel 800 is prevented from moving. Even if the release mechanism 112 is accessed, thieves are still deterred from stealing the vehicle because the steering wheel 800 is prevented from rotating.

Figure 9:
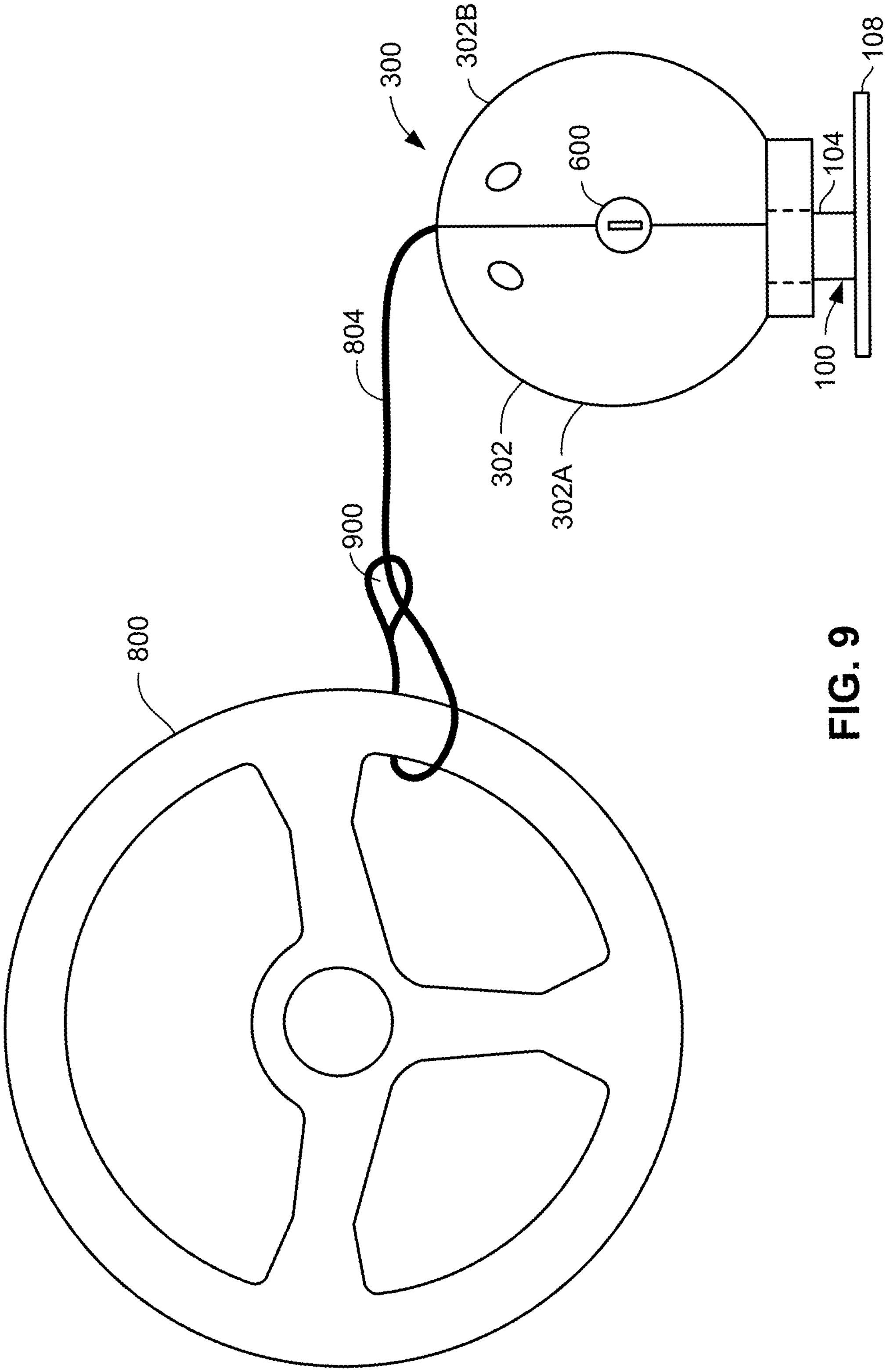
FIG. 9 illustrates the embodiment of FIG. 8 wherein the cord is locked to the housing when the housing is in the closed state in accordance with embodiments of the disclosure.

Additional reference is made to FIG. 9, which illustrates the embodiment of FIG. 8 wherein the cord 804 is locked to the housing 302 when the housing 302 or the theft deterrent box 300 is in the closed state. The cord 804 may have a loop 900 that secures the cord 804 to the steering wheel 800. In the embodiment of FIG. 9, the cord 804 may be inserted or locked between the first portion 302A and the second portion 302B of the housing 302. The cord 804 may be secured such that the cord 804 is locked to the theft deterrent box 300 when the theft deterrent box 300 is in the closed state. When the theft deterrent box 300 is transitioned to the open state, the cord 804 may be released from the housing 302. One of the benefits of these embodiments is that a single lock closes the theft deterrent box 300 and affixes the cord 804 to the theft deterrent box 300, which deters access to the gear shifter 100 and prevents rotation of the steering wheel 800.

Figure 10:
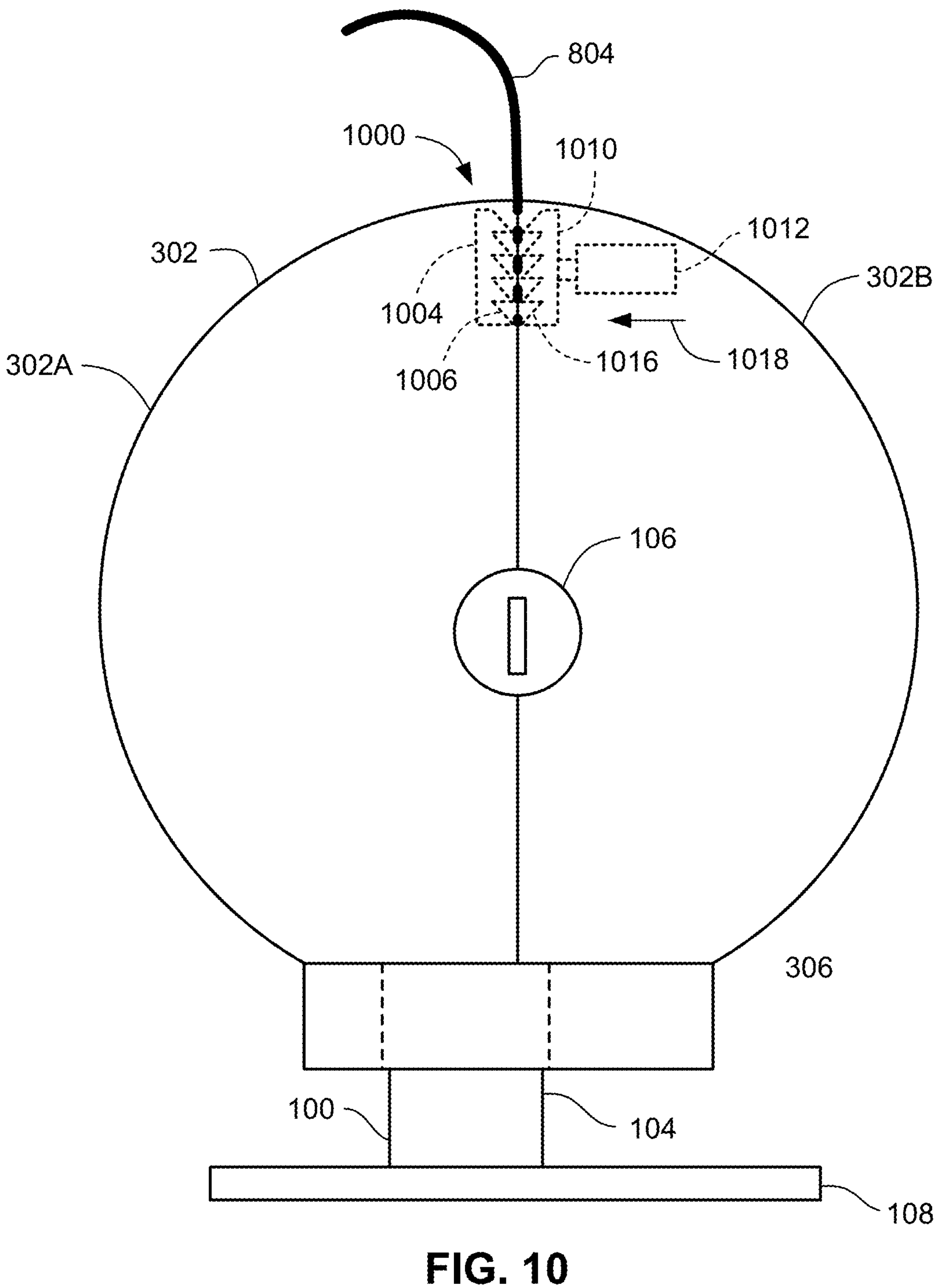
FIG. 10 illustrates a partial cutaway view of a theft deterrent box with a securing mechanism that secures a cord to the housing when the theft deterrent box is in a closed state in accordance with embodiments of the disclosure.

Additional reference is made to FIG. 10, which illustrates a partial cutaway view of the theft deterrent box 300 with a securing mechanism 1000 that secures the cord 804 to the housing 302 when the theft deterrent box 300 is in the closed state. The securing mechanism 1000 may also be configured to release the cord 804 from the theft deterrent box 300 when the theft deterrent box 300 is in the open state. The securing mechanism 1000 may include a first structure 1004 affixed to the first portion 302A of the housing 302. The first structure 1004 may have teeth 1006 that grasp a side of the cord 804. For example, if the cord 804 is soft, the teeth 1006 may slightly penetrate the cord 804. If the cord 804 is solid, such as a steel cable, the cord 804 may have indents (not shown) that are grasped by the teeth 1006.

The securing mechanism 1000 may include a second structure 1010 that, in some embodiments, may be affixed to the second portion 302B of the housing 302 by a spring mechanism 1012 or the like. That second structure 1010 may have teeth 1016 that are similar or identical to the teeth 1006. The spring mechanism 1012 forces the second structure 1010 and, thus the teeth 1016 in the direction 1018 when the housing 302 is in the closed state. Based on the foregoing, the securing mechanism 1000 locks the cord 804 to the housing 302 when the housing 302 is in the locked or closed state. The securing mechanism 1000 releases the cord 804 from the housing 302 when the housing is in the open state. Other devices may be used to attach the cord 804 to the theft deterrent box 300 when the theft deterrent box 300 is in the closed state.

Figure 11:
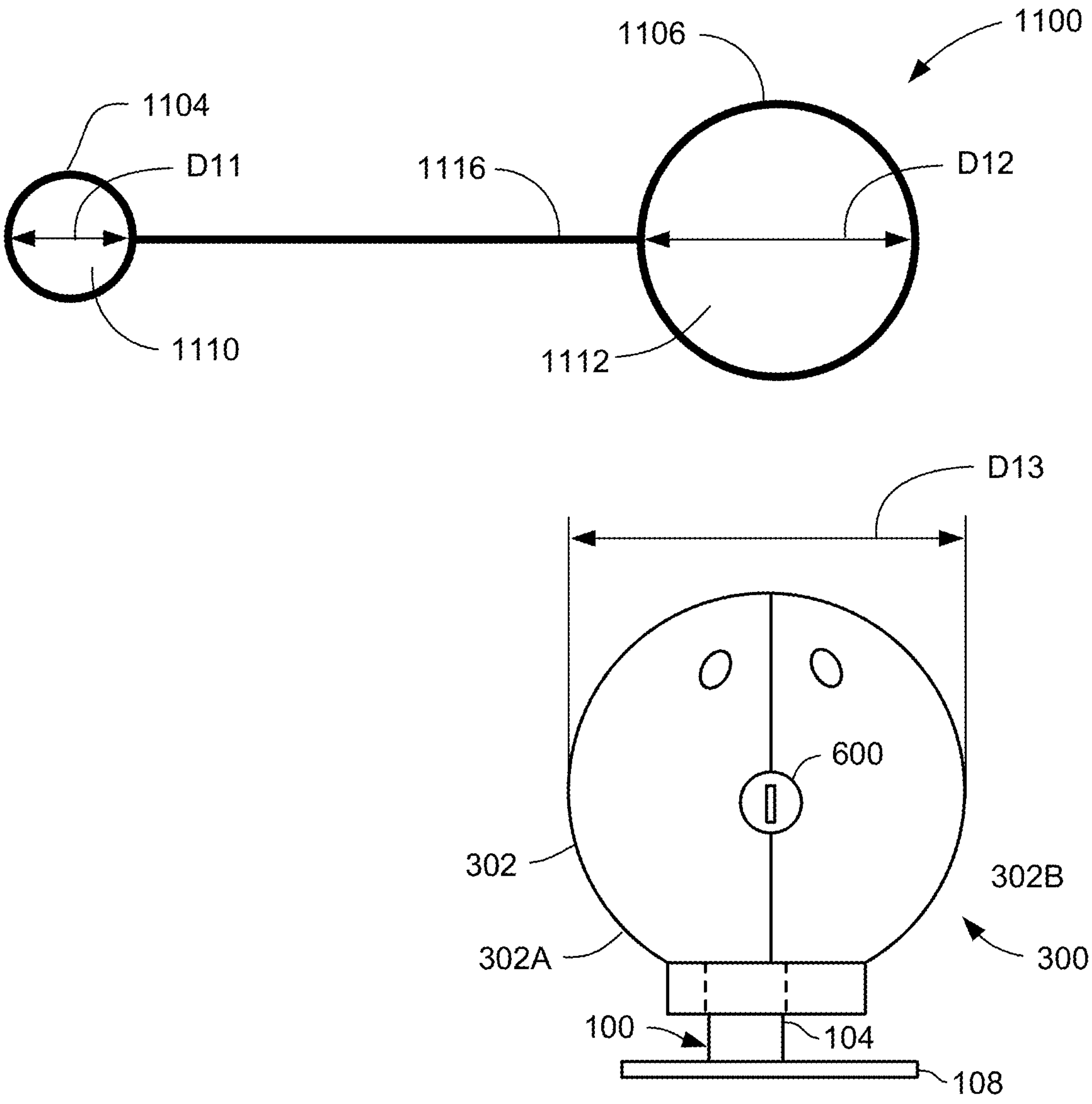
FIG. 11 illustrates a plan view of a theft deterrent system including a cord and a theft deterrent box, wherein a first end of the cord is configured to be affixed to a steering wheel of a vehicle and the second end of the cord has a loop configured to be placed over a shifter of the vehicle and retained in place by the theft deterrent box in accordance with embodiments of the disclosure.

Reference is made to FIG. 11, which illustrates a plan view of a cord 1100 in relation to the theft deterrent box 300, wherein the cord 1100 includes a first end 1104 and a second end 1106. The first end 1104 may have a first loop 1110 and the second end 1106 has a second loop 1112. A middle segment 1116 extends between the first end 1104 and the second end 1106. The middle segment 1116 may be a flexible material such as steel cable, fabric, synthetic fibers, or other material, including other flexible materials. The first end 1104 and the second end 1106 may be made from the same material as the middle segment 1116. As described herein, the first loop 1110 enables the cord 1100 to be affixed to a steering wheel and may be replaced by other devices configured to affix the cord 1100 to a steering wheel. The first loop 1110 may have a diameter D11 that enables the second end 1106 and the middle segment 1116 to pass through the loop 1110 as described herein. The second end 1106 may be flexible so as to contort to fit through the first loop 1110.

The second loop 1112 may have a diameter D12 and the theft deterrent box 300 may have a diameter D31. The diameter D31 may be the widest diameter of the theft deterrent box 300. The diameter D12, may be less than the diameter D13 of the theft deterrent box 300. In some embodiments, the diameter D12 of the second loop 1112 may be small enough so that the second loop 1112 cannot slide over the theft deterrent box 300. In embodiments wherein the theft deterrent box 300 is not spherical or partially spherical, the second loop 1112 may not be able to readily slide over the theft deterrent box 300. The diameter D12 may be large enough for the second end 1106 to pass over the handle 102 (FIG. 1) of the gear shifter 100. In some embodiments, the diameter D12 of the second loop 1112 may be large enough to pass over a widest part of the gear shifter 100.

Figure 12:
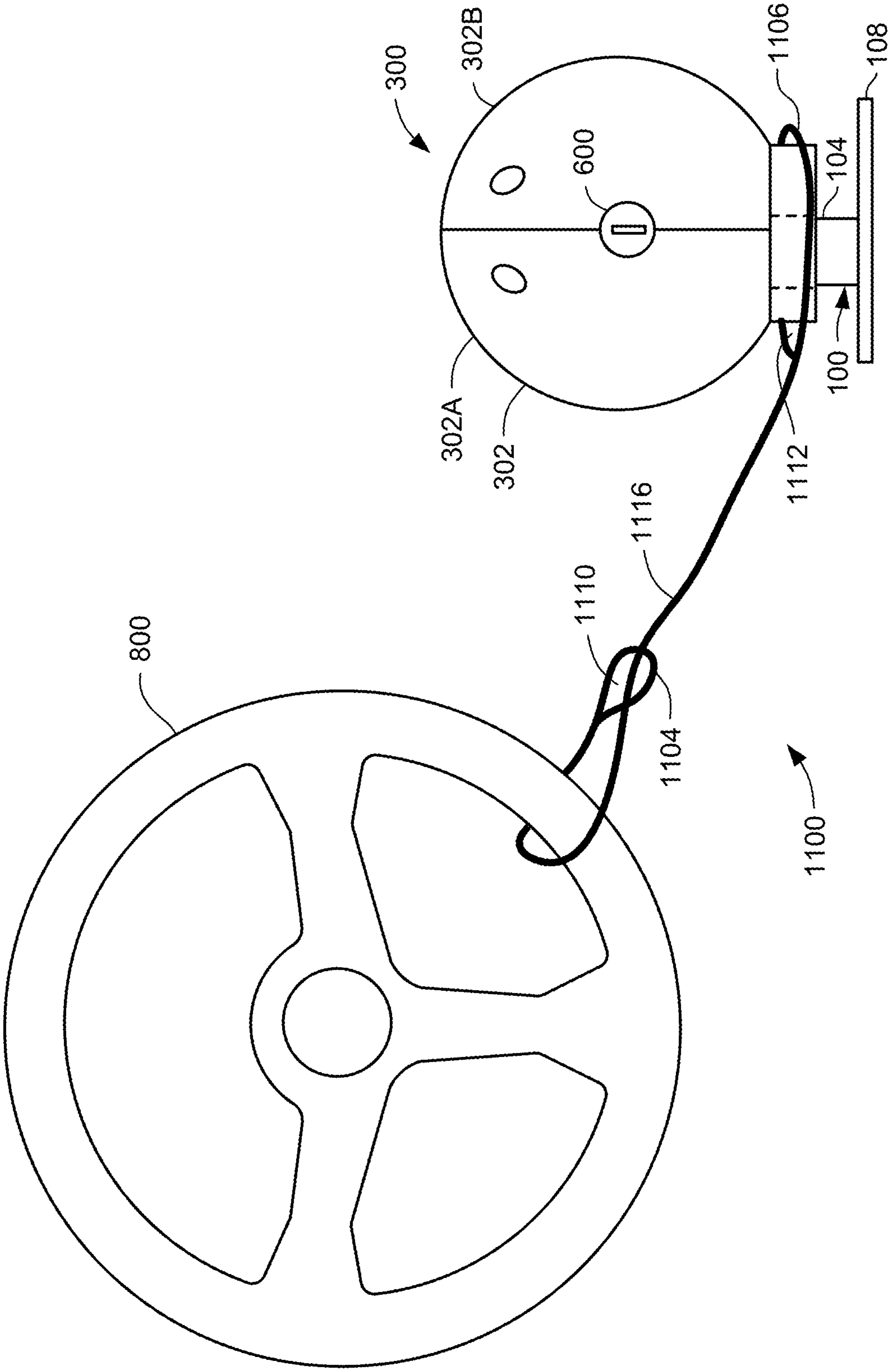
FIG. 12 illustrates the first end of the cord of FIG. 11 affixed to a steering wheel of a vehicle and the loop of the second end of the cord placed over a shifter of the vehicle and retained in place by the theft deterrent box in accordance with embodiments of the disclosure.

Additional reference is made to FIG. 12, which illustrates the first end 1104 of the cord 1100 affixed to the steering wheel 800 of the vehicle and the second end 1106 of the cord 1100 is placed over or around the gear shifter 100. In the embodiment of FIG. 12, the second loop 1112 is placed over the gear shifter 100, which prevents the cord 1100 from being removed from the gear shifter 100 when the theft deterrent box 300 is locked over the gear shifter 100. The flexibility of the middle segment 1116 enables the cord 1100 to be affixed between the steering wheel 800 and the gear shifter 100 regardless of their positions relative to each other. By affixing the cord 1100 between the gear shifter 100 and the steering wheel 800 with the theft deterrent box 300 locked over the gear shifter 100, the cord 1100 prevents the steering wheel 800 from being rotated. Accordingly, the vehicle is not able to be driven. The addition of the cord 1100 enhances the theft deterrence provided by the theft deterrent box 300.

In the embodiment of FIG. 12, the cord 1100 is affixed to the steering wheel 800 by passing the second end 1106 and the middle segment 1116 through the first loop 1110. The configuration of the cord 1100 does not require any additional locks to affix the cord 1100 between the steering wheel 800 and the gear shifter 100 to prevent or limit rotation of the steering wheel 800.

Figure 13A:
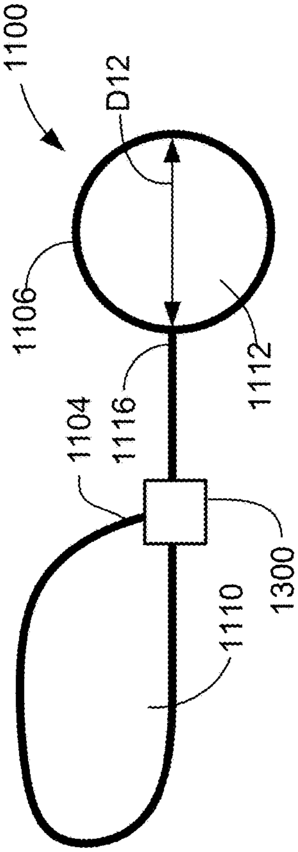
FIG. 13A illustrates an embodiment of the cord of FIG. 11 wherein the first end locks to the cord to secure the cord to the steering wheel in accordance with embodiments of the disclosure.
Figure 13B:
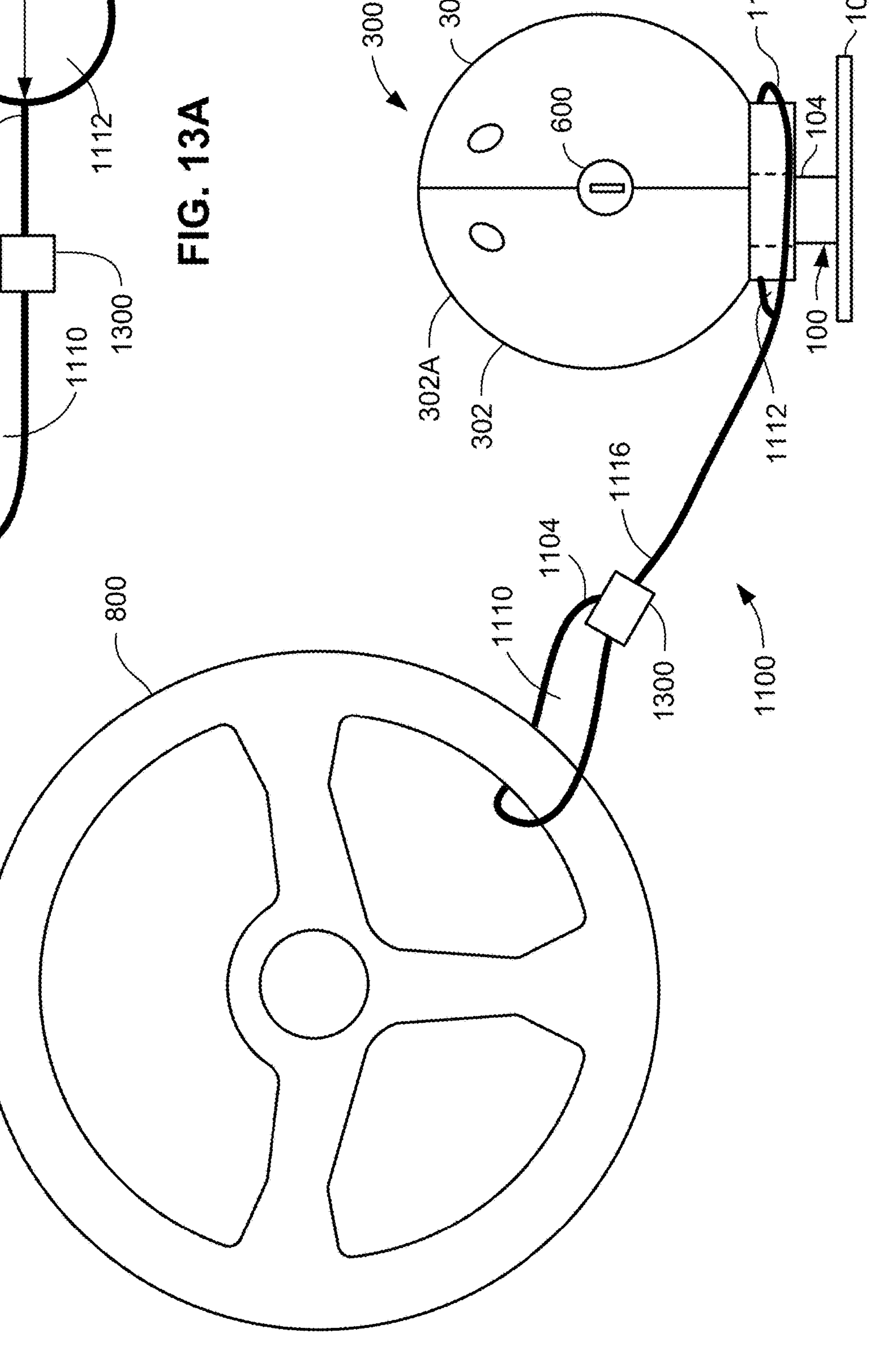
FIG. 13B illustrates a theft deterrent system including an embodiment of the cord of FIG. 13A affixed to a steering wheel in accordance with embodiments of the disclosure.

Additional reference is made to FIG. 13A, which illustrates an embodiment of a cord 1100 wherein the first end 1104 locks to the middle segment 1116. FIG. 13B illustrates an embodiment of the cord 1100 of FIG. 13A affixed to the steering wheel 800 in accordance with embodiments of the disclosure. In the embodiments of FIGS. 13A-13B, a lock 1300 locks the first end 1104 to the middle segment 1116 to form the first loop 1110. In use, the second loop 1112 may be placed over the gear shifter 100 as described herein. The theft deterrent box 300 may then be locked over the gear shifter 100 to retain the cord 1100 over the gear shifter 100. The first end 1104 of the cord 1100 may then be placed through the steering wheel 800 and locked to the middle segment 1116 via the lock 1300. Thus, rotation of the steering wheel 800 is prevented or limited, which deters theft of the vehicle. The lock 1300 may be activated to release the first end 1104 from the lock 1300 and enable the cord 1100 to be removed from the steering wheel 800.

Figure 14A:
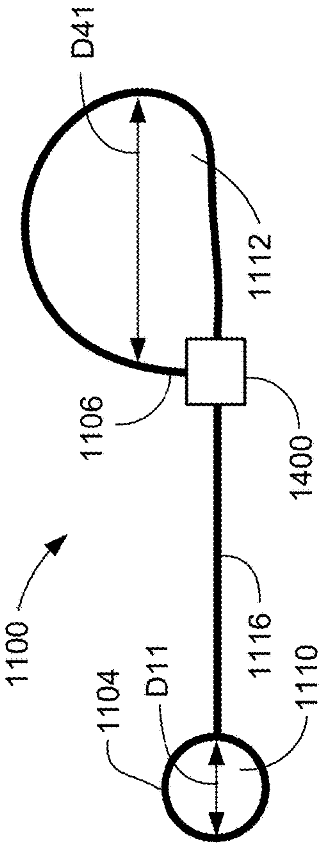
FIG. 14A illustrates an embodiment of a theft deterrent box including the cord of FIG. 11, wherein the second end locks to the cord to secure the cord to the steering wheel in accordance with embodiments of the disclosure.

Additional reference is made to FIG. 14A, which illustrates an embodiment of the cord 1100 wherein a lock 1400 is attached to the middle segment 1116 and is configured to receive the second end 1106 to form the second loop 1112. In some embodiments, the lock 1400 may be movable relative to the middle segment 1116 so that the diameter D41 of the second loop 1112 may be changeable. The handle 102 of the gear shifter 100 may have length L41 which may be the widest portion of the gear shifter 100. The second loop 1112 may be configured to be placed over the handle 102. For example, the diameter D41 may be configured to enable the second loop 1112 to fit over the handle 102 having the length L41. The diameter D41 of the second loop 1112 may be reduced by moving the lock 1400 relative to the middle segment 1116 so that the second loop 1112 may not be placed over the handle 102. Thus, the cord 1100 is retained between the gear shifter 100 and the steering wheel 800, which prevents or limits rotation of the steering wheel 800.

In other embodiments, the second end 1106 may be removed from the lock 1400. The second end 1106 may be placed around the shaft 104 and under the handle 102. The second end 1106 may be locked into the lock 1400, which secures the cord 1100 to the gear shifter 100. The lock 1400 may be released to remove the second end 1106 from the lock 1400 so that the cord 1100 may be removed from the gear shifter 100 and the steering wheel 800.

Figure 15:
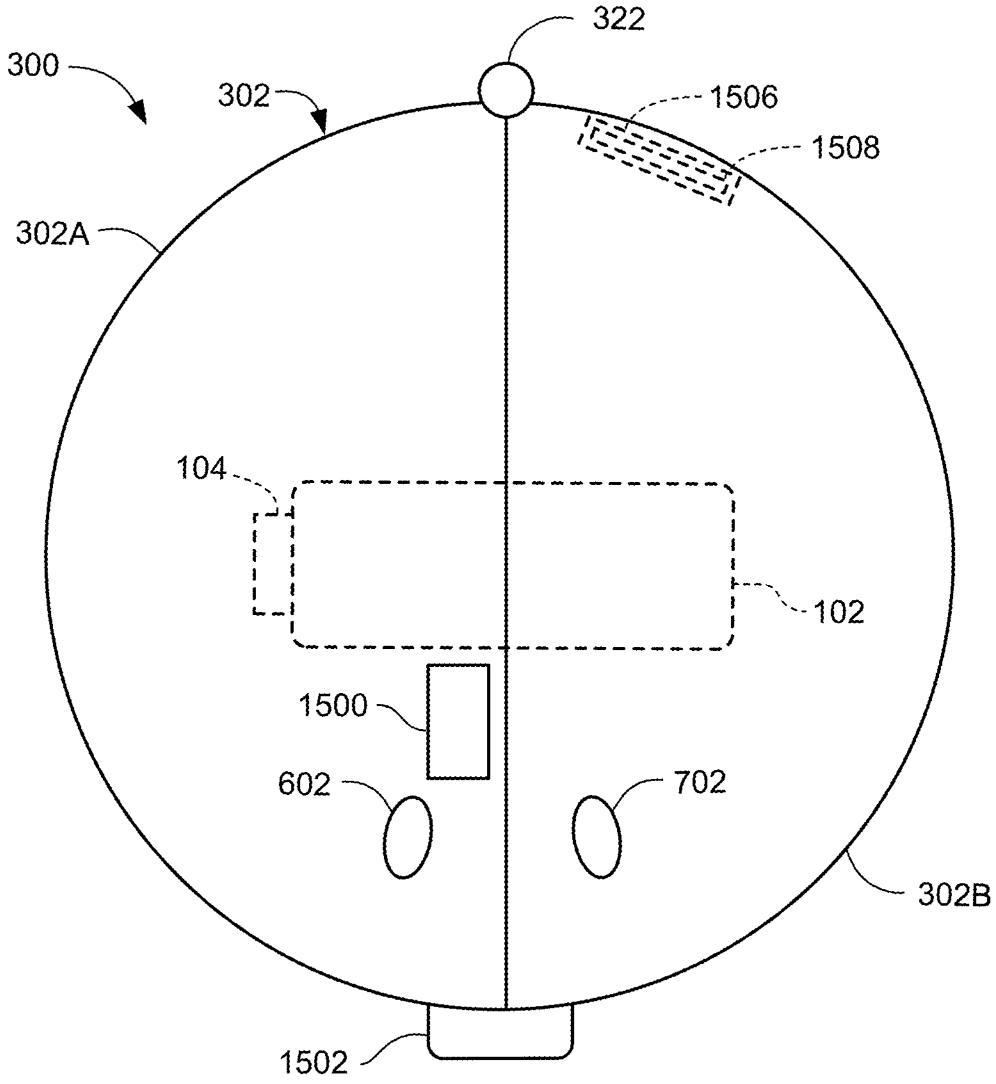
FIG. 15 illustrates an embodiment of a theft deterrent box with a reader affixed to the theft deterrent box.

As described above, several devices and/or methods may be utilized to transition the theft deterrent box 300 between the open state and the closed state. These embodiments may or may not also use the key 700 or other locking devices described herein. Additional reference is made to FIG. 15, which illustrates an embodiment of the theft deterrent box 300 with a generic reader 1500. Various embodiments of the reader 1500 are described herein.

In some embodiments, the reader 1500 may be a biometric reader configured to generate biometric data of the user. The theft deterrent box 300 may be configured to transition to the open state in response to reading the biometric data. For example, the biometric reader may be configured to read fingerprints and may identify whether the fingerprints read belong to a designated user (e.g., owner of the theft deterrent box 300). If so, the reader 1500 may active a locking device 1502 to lock or unlock the theft deterrent box 300. For example, the reader 1500 may generate a signal or the like that is transmitted to the locking device 1502, wherein the locking device opens or locks the theft deterrent box 300 in response to the signal.

In some embodiments, the reader 1500 may include a microphone or the like configured to recognize commands and/or voices of the owner. In some embodiments, reader may identify the voices and/or commands to determine if audio received by the reader 1500 is from the owner. The reader 1500 may also decode audio commands. In response to the decoding and the like, the reader 1500 may transmit signals to the locking device 1502 that cause the theft deterrent box 300 to open or lock.

In some embodiments, the reader 1500 may be a proximity detector that is configured to determine whether a transmitter carried by the user is within a predetermined distance from the reader 1500. For example, the owner may carry a transmitter. When the transmitter is within a predetermined distance from the reader 1500, the reader may generate a signal that causes the locking device 1502 to unlock. When the transmitter is not within the predetermined distance, the reader 1500 may generate a signal that causes the locking device 1502 to lock.

Accordingly, the theft deterrent box 300 may enter a lock state when the transmitter is outside the predetermined distance and may enter an unlocked or open state when the transmitter is within the predetermined distance. Accordingly, while the owner is in the vehicle, the owner may set the theft deterrent box 300 over the shifter 100 as described herein. When the owner leaves the vehicle, the transmitter will be further than the predetermined distance, which causes the locking device 1502 to lock.

In some embodiments, the transmitter may be cellular telephone, a tablet, a smartwatch or the like. In these embodiments, the owner may transmit signals from the cellular telephone that causes the locking device 1502 to lock or unlock. In some embodiments, the interior of the housing 302 may include a pocket 1506 configured to receive a global positioning system (GPS) device 1508. The GPS device 1508 may be a portable device configured to transmit global position information to the owner, such as to a portable device of the owner. Thus, should a thief steal the vehicle, the owner may be able to track the location of the vehicle. In some embodiments, the functions of the motion sensor 500 (FIG. 5) and/or the transmitter 502 may be integrated into the GPS device 1508.

Figure 14B:
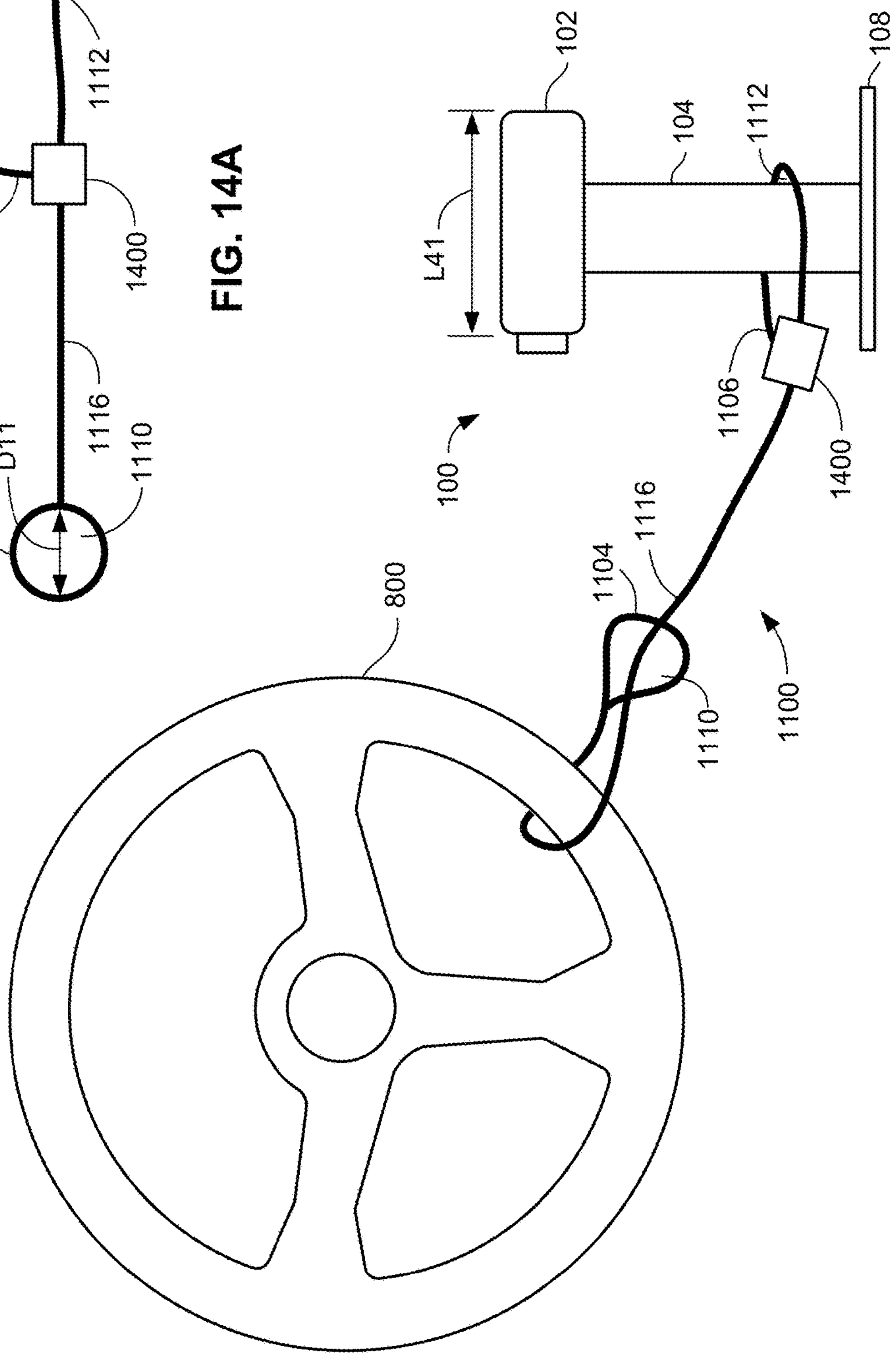
FIG. 14B illustrates an embodiment of the cord of FIG. 14A affixed to a steering wheel and a shifter without a theft deterrent box in accordance with embodiments of the disclosure.
Figure 16A:
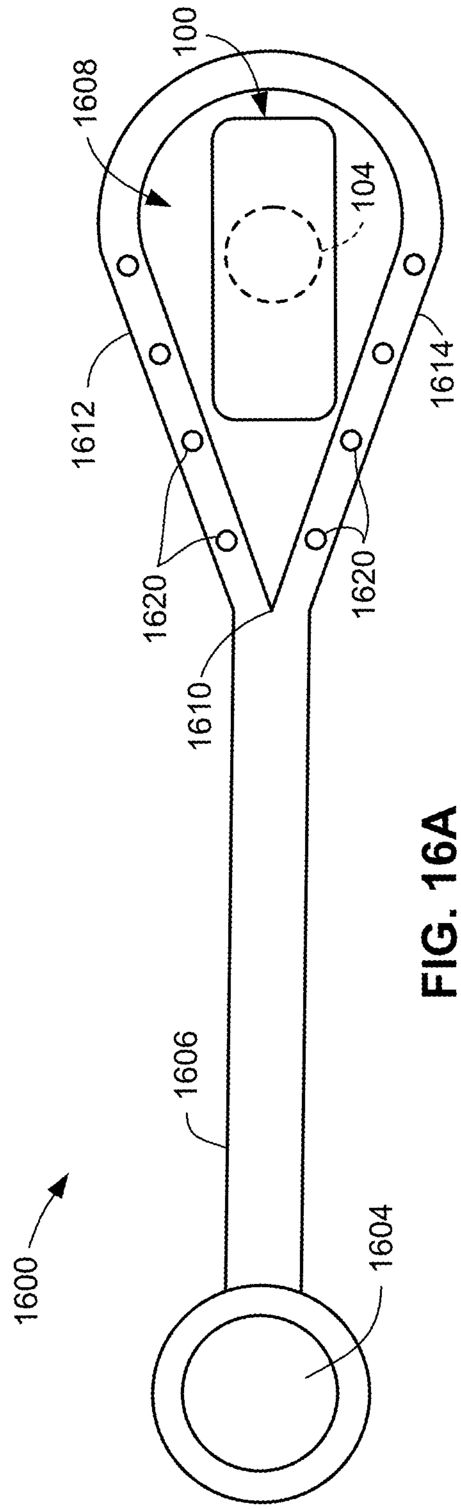
FIG. 16A illustrates a cord with an opening placed over a handle of a gear shifter, wherein the cord is configured to attach to a steering wheel according to one or more embodiments.
Figure 16B:
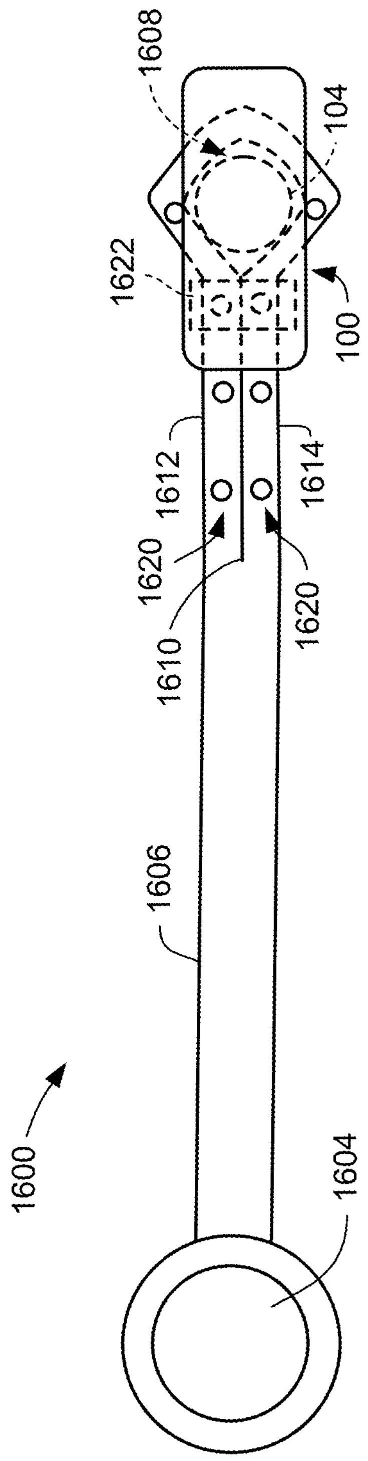
FIG. 16B illustrates the cord of FIG. 16A with the opening placed around a handle of the gear shifter, wherein the cord is unable to be removed from the gear shifter according to one or more embodiments.

Additional reference is made to FIG. 16A, which illustrates an embodiment of a cord 1600 configured to secure between the gear shifter 100 and the steering wheel 800, FIG. 14B. The cord 1600 may include a first loop 1604 configured to secure the cord 1600 to a steering wheel as shown by the steering wheel 800 of FIG. 14B. A middle segment 1606 connects the first loop 1604 with a second loop 1608. The second loop 1608 may be formed by a slit or the like in the middle segment 1606 that ends at a point 1610. The second loop 1608 may be characterized as including a first portion 1612 and an opposite second portion 1614.

The first portion 1612 and the second portion 1614 may include a plurality of connector devices 1620 that are configured to connect the first portion 1612 and the second portion 1614 together to secure the second loop 1608 around the shaft 104 of the gear shifter 100. In some embodiments, the connector devices 1620 may be holes, wherein a lock 1622 connects or locks one of the connector devices 1620 on the first portion 1612 to a corresponding connector device 1620 on the second portion 1614. When the cord 1600 is attached to the steering wheel 800 and the lock 1622 tightens the second loop 1608 around the shaft 104, movement of the steering wheel 800 is limited and the vehicle is inoperable. The user may remove the lock 1622 to remove the cord 1600 from the gear shifter 100 and make the vehicle operable.

The foregoing description discloses only example embodiments of the invention; modifications of the above disclosed apparatus and methods which fall within the scope of the invention will be readily apparent to those of ordinary skill in the art. Accordingly, while the present invention has been disclosed in connection with the example embodiments thereof, it should be understood that other embodiments may fall within the spirit and scope of the invention, as defined by the following claims.

What is claimed is:

1. A theft deterrent box comprising:

a housing having at least a first portion and a second portion, wherein the theft deterrent box has an open state when at least a portion of a gear shifter of a vehicle is receivable in the housing and wherein the housing has a closed state when at least a portion of the gear shifter is received in the housing and the housing is not removable from the gear shifter;

a lock integrated into one of the first portion or the second portion, the lock configured to maintain the housing in a closed state and release the housing to the open state;

a cord having a first end and a second end, wherein the first end is configured to couple to a steering wheel of the vehicle and wherein the second end is configured to couple to the housing;

a first hole configured to receive a shaft of a first gear shifter; and a second hole configured to receive a shaft of a second gear shifter, wherein the first hole has a different diameter than the second hole.

2. The theft deterrent box of claim 1, wherein the housing is configured to receive a handle of the gear shifter.

3. The theft deterrent box of claim 1, further comprising at least one hole configured to receive a shaft of the gear shifter.

4. The theft deterrent box of claim 3, further comprising a block removable from the first portion and the second portion, wherein the hole passes through the block.

5. The theft deterrent box of claim 1, wherein when the housing is in the open state, at least a portion of the first portion of the housing is separate from at least a portion of the second portion of the housing.

6. The theft deterrent box of claim 1, wherein when the housing is in the closed state, the first portion and the second portion form a cavity, wherein at least a portion of the gear shifter is receivable in the cavity.

7. The theft deterrent box of claim 1, further comprising a lock wherein the lock is configured to lock the first portion and the second portion in the closed state.

8. The theft deterrent box of claim 1, wherein the first portion and the second portion are joined by a hinge.

9. The theft deterrent box of claim 1, further comprising a hole configured to receive a shaft of the gear shifter, wherein the gear shifter has a handle, and wherein the hole has a diameter smaller than a diameter of the handle.

10. The theft deterrent box of claim 1, further comprising a biometric reader configured to read biometric data of a user, and wherein the housing is configured to transition to the open state in response to reading the biometric data.

11. A theft deterrent system comprising:

theft deterrent box comprising a housing having at least a first portion and a second portion, wherein the theft deterrent box has an open state when at least a portion of a gear shifter of a vehicle is receivable in the housing and wherein the housing has a closed state when at least a portion of the gear shifter is received in the housing and the housing is not removable from the gear shifter; and a cord having a first end and a second end, wherein the first end is configured to couple to a steering wheel of the vehicle and wherein the second end has a loop configured to be placed over a shaft of a gear shifter and wherein the theft deterrent box retains the loop over the shaft when the theft deterrent box is in the closed state.

12. The theft deterrent system of claim 11, wherein the second end of the cord is configured to couple to the theft deterrent box.

13. The theft deterrent system of claim 11, wherein the cord has a first end and a second end, the first end configured to couple to a steering wheel of the vehicle and the second end configured to couple to the theft deterrent box when the theft deterrent box is in the closed state.

14. The theft deterrent system of claim 13, wherein the second end of the cord is configured to release from the theft deterrent box when the theft deterrent box is in the open state.

15. The theft deterrent system of claim 11, wherein the loop has an opening having a size greater than a widest portion of the gear shifter and smaller than a diameter of the theft deterrent box.

16. The theft deterrent system of claim 11, wherein the first end has a loop, wherein the cord is configured to pass through an opening in the steering wheel, and wherein the second end is configured to pass through the loop in the first end to couple the cord to the steering wheel.

17. The theft deterrent system of claim 11, further comprising at least one lock configured to couple the cord to the gear shifter.

18. A cord comprising:

a first end configured to couple to a steering wheel of a vehicle;

a second end having a loop configured to change between a first diameter and a second diameter, wherein the loop is configured to pass over a shifter of a vehicle shift handle when the loop has the first diameter and wherein the loop is configured to be located around a shaft of the shifter of the vehicle and prevented from passing over the handle when the loop has the second diameter; and a lock configured to maintain the loop in the second diameter.

* * * * *